(12) United States Patent
Montemerlo et al.

(10) Patent No.: US 8,718,861 B1
(45) Date of Patent: May 6, 2014

(54) DETERMINING WHEN TO DRIVE AUTONOMOUSLY

(75) Inventors: Michael Steven Montemerlo, Mountain View, CA (US); Hyman Jack Murveit, Portola Valley, CA (US); Christopher Paul Urmson, Mountain View, CA (US); Dmitri A. Dolgov, Mountain View, CA (US); Philip Nemec, San Jose, CA (US)

(73) Assignee: Google Inc., Mountain View, CA (US)

( * ) Notice: Subject to any disclaimer, the term of this patent is extended or adjusted under 35 U.S.C. 154(b) by 111 days.

(21) Appl. No.: 13/444,215

(22) Filed: Apr. 11, 2012

(51) Int. Cl.
*G05D 1/00* (2006.01)

(52) U.S. Cl.
USPC .............................. 701/26; 701/411; 701/533

(58) Field of Classification Search
USPC ...................... 701/23–26, 408–411, 532, 533
See application file for complete search history.

(56) References Cited

U.S. PATENT DOCUMENTS

| | | | |
|---|---|---|---|
| 1,924,984 A | 8/1933 | Fageol | |
| 3,186,508 A | 6/1965 | Lamont | |
| 3,324,805 A | 6/1967 | Mulch | |
| 3,596,728 A | 8/1971 | Neville | |
| 4,372,414 A | 2/1983 | Anderson et al. | |
| 4,387,783 A | 6/1983 | Carman | |
| 4,656,834 A | 4/1987 | Elpern | |
| 4,924,795 A | 5/1990 | Ottemann | |
| 4,982,072 A | 1/1991 | Takigami | |
| 5,187,666 A | 2/1993 | Watanabe | |
| 5,415,468 A | 5/1995 | Latarnik et al. | |
| 5,448,487 A | 9/1995 | Arai | |
| 5,470,134 A | 11/1995 | Toepfer et al. | |
| 5,684,696 A | 11/1997 | Rao et al. | |
| 5,774,069 A | 6/1998 | Tanaka et al. | |

(Continued)

FOREIGN PATENT DOCUMENTS

| EP | 2216225 A1 | 8/2010 |
|---|---|---|
| JP | 09-160643 A | 6/1997 |

(Continued)

OTHER PUBLICATIONS

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

(Continued)

*Primary Examiner* — Russell Frejd
(74) *Attorney, Agent, or Firm* — Lerner, David, Littenberg, Krumholz & Mentlik, LLP

(57) ABSTRACT

Aspects of the disclosure relate generally to determining whether an autonomous vehicle should be driven in an autonomous or semiautonomous mode (where steering, acceleration, and braking are controlled by the vehicle's computer). For example, a computer may maneuver a vehicle in an autonomous or a semiautonomous mode. The computer may continuously receive data from one or more sensors. This data may be processed to identify objects and the characteristics of the objects. The detected objects and their respective characteristics may be compared to a traffic pattern model and detailed map information. If the characteristics of the objects deviate from the traffic pattern model or detailed map information by more than some acceptable deviation threshold value, the computer may generate an alert to inform the driver of the need to take control of the vehicle or the computer may maneuver the vehicle in order to avoid any problems.

39 Claims, 11 Drawing Sheets

(56) References Cited

U.S. PATENT DOCUMENTS

| | | |
|---|---|---|
| 5,906,645 A | 5/1999 | Kagawa et al. |
| 6,064,926 A | 5/2000 | Sarangapani et al. |
| 6,070,682 A | 6/2000 | Isogai et al. |
| 6,151,539 A | 11/2000 | Bergholz et al. |
| 6,195,610 B1 | 2/2001 | Kaneko |
| 6,321,147 B1 | 11/2001 | Takeda et al. |
| 6,332,354 B1 | 12/2001 | Lalor et al. |
| 6,343,247 B2 | 1/2002 | Jitsukata et al. |
| 6,438,472 B1 | 8/2002 | Tano et al. |
| 6,438,491 B1 * | 8/2002 | Farmer ............... 701/301 |
| 6,470,874 B1 | 10/2002 | Mertes |
| 6,504,259 B1 | 1/2003 | Kuroda et al. |
| 6,516,262 B2 | 2/2003 | Takenaga et al. |
| 6,591,172 B2 | 7/2003 | Oda et al. |
| 6,643,576 B1 | 11/2003 | O Connor et al. |
| 6,832,156 B2 * | 12/2004 | Farmer ............... 701/301 |
| 6,847,869 B2 | 1/2005 | Dewberry et al. |
| 6,862,524 B1 | 3/2005 | Nagda et al. |
| 6,876,908 B2 | 4/2005 | Cramer et al. |
| 6,934,613 B2 | 8/2005 | Yun |
| 7,011,186 B2 | 3/2006 | Frentz et al. |
| 7,031,829 B2 | 4/2006 | Nisiyama |
| 7,102,496 B1 | 9/2006 | Ernst, Jr. et al. |
| 7,194,347 B2 | 3/2007 | Harumoto et al. |
| 7,207,304 B2 | 4/2007 | Iwatsuki et al. |
| 7,233,861 B2 | 6/2007 | Van Buer et al. |
| 7,327,242 B2 | 2/2008 | Holloway et al. |
| 7,346,439 B2 | 3/2008 | Bodin |
| 7,394,046 B2 | 7/2008 | Olsson et al. |
| 7,486,802 B2 | 2/2009 | Hougen |
| 7,499,774 B2 | 3/2009 | Barrett et al. |
| 7,499,776 B2 | 3/2009 | Allard et al. |
| 7,499,804 B2 | 3/2009 | Svendsen et al. |
| 7,515,101 B1 | 4/2009 | Bhogal et al. |
| 7,579,942 B2 | 8/2009 | Kalik |
| 7,656,280 B2 | 2/2010 | Hines et al. |
| 7,694,555 B2 | 4/2010 | Howell et al. |
| 7,818,124 B2 | 10/2010 | Herbst et al. |
| 7,865,277 B1 | 1/2011 | Larson et al. |
| 7,894,951 B2 | 2/2011 | Norris et al. |
| 7,908,040 B2 | 3/2011 | Howard et al. |
| 7,956,730 B2 | 6/2011 | White et al. |
| 8,050,863 B2 | 11/2011 | Trepagnier et al. |
| 8,078,349 B1 | 12/2011 | Prada Gomez et al. |
| 8,190,322 B2 | 5/2012 | Lin et al. |
| 8,195,341 B2 | 6/2012 | Huang et al. |
| 8,244,408 B2 | 8/2012 | Lee et al. |
| 8,260,515 B2 | 9/2012 | Huang et al. |
| 8,280,601 B2 | 10/2012 | Huang et al. |
| 2001/0037927 A1 | 11/2001 | Nagler et al. |
| 2003/0016804 A1 | 1/2003 | Sheha et al. |
| 2003/0055554 A1 | 3/2003 | Shioda et al. |
| 2003/0093209 A1 | 5/2003 | Andersson et al. |
| 2004/0243292 A1 | 12/2004 | Roy |
| 2005/0012589 A1 | 1/2005 | Kokubu et al. |
| 2005/0273251 A1 | 12/2005 | Nix et al. |
| 2006/0037573 A1 | 2/2006 | Iwatsuki et al. |
| 2006/0082437 A1 | 4/2006 | Yuhara |
| 2006/0089764 A1 | 4/2006 | Filippov et al. |
| 2006/0178240 A1 | 8/2006 | Hansel |
| 2006/0276942 A1 | 12/2006 | Anderson et al. |
| 2007/0165910 A1 | 7/2007 | Nagaoka et al. |
| 2007/0225909 A1 | 9/2007 | Sakano |
| 2007/0239331 A1 | 10/2007 | Kaplan |
| 2007/0247281 A1 | 10/2007 | Shimomura |
| 2008/0021628 A1 | 1/2008 | Tryon |
| 2008/0059048 A1 | 3/2008 | Kessler et al. |
| 2008/0084283 A1 | 4/2008 | Kalik |
| 2008/0120025 A1 | 5/2008 | Naitou et al. |
| 2008/0147253 A1 | 6/2008 | Breed |
| 2008/0161987 A1 | 7/2008 | Breed |
| 2008/0183512 A1 | 7/2008 | Benzinger et al. |
| 2008/0188246 A1 | 8/2008 | Sheha et al. |
| 2008/0277183 A1 | 11/2008 | Huang et al. |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0082879 A1 | 3/2009 | Dooley et al. |
| 2009/0115594 A1 | 5/2009 | Han |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0319096 A1 | 12/2009 | Offer et al. |
| 2009/0319112 A1 | 12/2009 | Fregene et al. |
| 2009/0326799 A1 | 12/2009 | Crook |
| 2010/0017056 A1 | 1/2010 | Asakura et al. |
| 2010/0052945 A1 | 3/2010 | Breed |
| 2010/0076640 A1 | 3/2010 | Maekawa et al. |
| 2010/0179720 A1 | 7/2010 | Lin et al. |
| 2010/0205132 A1 | 8/2010 | Taguchi |
| 2010/0228419 A1 | 9/2010 | Lee et al. |
| 2010/0241297 A1 | 9/2010 | Aoki et al. |
| 2010/0253542 A1 * | 10/2010 | Seder et al. ............ 340/932.2 |
| 2010/0256836 A1 | 10/2010 | Mudalige |
| 2011/0071718 A1 | 3/2011 | Norris et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0254655 A1 | 10/2011 | Maalouf et al. |
| 2012/0053775 A1 | 3/2012 | Nettleton et al. |
| 2012/0157052 A1 | 6/2012 | Quade |
| 2012/0277947 A1 | 11/2012 | Boehringer et al. |

FOREIGN PATENT DOCUMENTS

| | | |
|---|---|---|
| JP | 11282530 A | 10/1999 |
| JP | 2000149188 A | 5/2000 |
| JP | 2000305625 A | 11/2000 |
| JP | 2000-338008 A | 12/2000 |
| JP | 2001-101599 A | 4/2001 |
| JP | 2002236993 A | 8/2002 |
| JP | 2002251690 A | 9/2002 |
| JP | 2003081039 A | 3/2003 |
| JP | 2003162799 A | 6/2003 |
| JP | 2005067483 A | 3/2005 |
| JP | 2005071114 A | 3/2005 |
| JP | 2005-339181 A | 12/2005 |
| JP | 2006322752 A | 11/2006 |
| JP | 2007001475 A | 1/2007 |
| JP | 2008117082 A | 5/2008 |
| JP | 2008152655 A | 7/2008 |
| JP | 2008170404 A | 7/2008 |
| JP | 2008290680 A | 12/2008 |
| JP | 2009053925 A | 3/2009 |
| WO | 0070941 A1 | 11/2000 |
| WO | 0188827 | 11/2001 |
| WO | 2009028558 A1 | 3/2009 |
| WO | 2011021046 A1 | 2/2011 |

OTHER PUBLICATIONS

"Google Cars Drive Themselves, in Traffic" [online]. [Retrieved Aug. 19, 2011] Retrieved from the internet: <http://www.nytimes.com/2010/10/10/science/10google.html>, 4 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for The 2007 Darpa Urban Challenge, Dec. 2007, 27 pages.

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

Vincenzo DiLecce and Marco Calabrese, Experimental System to Support Real-Time Driving Pattern Recognition, 2008, pp. 1192-1199.

International Search Report and the Written Opinion for Application No. PCT/US 2011/054154, Apr. 24, 2012.

International Search Report and Written Opinion for Application No. PCT/UC2011/054899 dated May 4, 2012.

International Search Report and the Written Opinion for Application No. PCT/US 2011/054896, Apr. 25, 2012.

* cited by examiner

DETERMINING WHEN TO DRIVE AUTONOMOUSLY

BACKGROUND

Autonomous vehicles use various computing systems to aid in the transport of drivers from one location to another. Some autonomous vehicles may require some initial input or continuous input from an operator, such as a pilot or driver. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

These autonomous vehicles may maneuver themselves between locations using highly detailed maps in conjunction with sensors for detecting the vehicle's surroundings. If the detailed maps are incorrect, it may be particularly difficult for the vehicle to navigate without input from the driver.

In some driving situations, a driver may not feel particularly safe relying completely upon the vehicle to maneuver itself. For example, a driver may feel less safe in areas with dense traffic or in close proximity to a vehicle that is moving erratically. Thus, some drivers may feel the need to continuously monitor the vehicle's location in case the driver must take control of the vehicle from the vehicle's autonomous computing system. This may lessen the usefulness of an autonomous vehicle and a driver's sense of safety.

BRIEF SUMMARY

One aspect of the disclosure provides a method. The method includes receiving data from one or more sensors associated with a vehicle; detecting an object and a characteristic for the detected object based on the received data; determining, by a processor, a deviation value for the detected object based on a comparison of the characteristic for the detected object to the traffic pattern model information, the traffic pattern model information including an expected range of values for a characteristic of objects in the road; comparing the deviation value to a threshold deviation value for an expected range of values for the characteristic; and when the deviation value is outside of the threshold deviation value, providing a notification to a driver of the vehicle.

In one example, the method also includes receiving input from the driver indicating that the driver has taken control of the vehicle. In another example, the characteristic includes a position of the detected object and the deviation value is determined by calculating a difference between the position of the detected object and an expected range of values for position defined in the traffic pattern model information. In yet another example, the characteristic includes a speed of the detected object and the deviation value is determined by calculating a difference between the speed of the detected object and an expected range of values for speed defined in the traffic pattern model information. In a further example, the characteristic includes a trajectory of the detected object and the deviation value is determined by calculating a difference between the trajectory of the detected object and an expected range of values for trajectory defined in the traffic pattern model information. In still a further example, the method also includes detecting a second object and a second characteristic for the second detected object based on the received data; determining a second deviation value for the second detected object based on a comparison of the second characteristic for the second detected object to the traffic pattern model information; comparing the second deviation value to the threshold deviation value for an expected range of values for the second characteristic; and when the deviation value is within the threshold deviation value and the second deviation value is outside of the second threshold deviation value, providing the notification to the driver the vehicle. In another example, the method also includes detecting a second object and a second characteristic for the detected object based on the received data; determining a second deviation value for the second detected object based on a comparison of the second characteristic for the second detected object to the traffic pattern model information; and before providing the notification, determining whether the second deviation value is within the second threshold deviation value based on a comparison of the second deviation value to the second threshold deviation value. In yet another example, the method also includes determining a second deviation value for the detected object based on a comparison of the characteristic for the detected object to detailed map information describing expected features of the road and characteristics of the expected features; comparing the second deviation value to a second threshold deviation value for the expected characteristics of the expected features; and when the second deviation value is outside of the second threshold deviation value, providing the notification to the driver of the vehicle.

Another aspect of the disclosure provides a method. The method includes receiving data from one or more sensors associated with a vehicle; detecting an object and a characteristic for the detected object based on the received data; determining, by a processor, a deviation value for the detected object based on a comparison of the characteristic to detailed map information describing expected features of the road and characteristics of the expected features; comparing the deviation value to a threshold deviation value for the expected characteristics of the expected features; when the deviation value is outside of the threshold deviation value, providing a notification to the driver of the vehicle.

In one example, the method also includes receiving input from the driver indicating that the driver has taken control of the vehicle. In another example, the characteristic includes a position of the detected object and the deviation value is determined by calculating a difference between the position of the detected object and an expected characteristic for position defined in the detailed map information. In yet another example, the characteristic includes a shape of the detected object and the deviation value is determined by calculating a difference between the shape of the detected object and an expected characteristic for shape defined in the detailed map information. In a further example, the characteristic includes a size of the detected object and the deviation value is determined by calculating a difference between the size of the detected object and an expected characteristic for size defined in the detailed map information. In still a further example, the method also includes detecting a second object and a second characteristic for the second detected object based on the received data; determining a second deviation value for the second detected object based on a comparison of the second characteristic and the map information; comparing the second deviation value to a second threshold deviation value for the expected characteristics of the expected features; and when the deviation value is within the threshold deviation value and the second deviation value is outside of the second threshold deviation value, providing a notification to the driver of the vehicle. In another example, the method also includes detecting a second object and a second characteristic for the second detected object based on the received data; determining a second deviation value for the second detected object based on a comparison of the second characteristic and the detailed map information; and before providing the notification, determining whether the second deviation value is within the second threshold deviation value.

A further aspect of the disclosure provides a method. The method includes receiving data from one or more sensors associated with a vehicle; detecting an object and a characteristic for the detected object based on the received data; determining, by a processor, a deviation value for the detected object based on a comparison of the characteristic and traffic pattern model information, the traffic pattern model information including an expected range of values for a characteristic of objects in the road; comparing the deviation value to a threshold deviation value for the expected range of values for the characteristic of the given object; and when the deviation value is outside of the threshold deviation value, maneuvering, without input from a driver, the vehicle defensively.

In one example, maneuvering the vehicle defensively includes slowing the vehicle down, changing lanes, or increasing the distance between the vehicle and another object. In another example, the characteristic includes a position of the detected object and the deviation value is determined by calculating a difference between the position of the detected object and an expected range of values for position defined in the traffic pattern model information. In yet another example, the characteristic includes a speed of the detected object and the deviation value is determined by calculating a difference between the speed of the detected object and an expected range of values for speed defined in the traffic pattern model information. In a further example, the characteristic includes a trajectory of the detected object and the deviation value is determined by calculating a difference between the trajectory of the detected object and an expected range of values for trajectory defined in the traffic pattern model information. In still a further example, the method also includes detecting a second object and a second characteristic for the detected object based on the received data; determining a second deviation value for the second detected object based on a comparison of the second characteristic to the traffic pattern model information; comparing the second deviation value to a second threshold deviation value for the expected range of values for the characteristic of the given object; and when the deviation value is within the threshold deviation value and the second deviation value is outside of the second threshold deviation value, maneuvering the vehicle defensively. In another example, detecting a second object and a second characteristic for the detected object based on the received data; determining a second deviation value for the second detected object based on a comparison of the second characteristic and the traffic pattern model information; and before maneuvering the vehicle defensively, determining whether the second deviation value is within the second threshold deviation value based on a comparison of the second deviation value to the second threshold deviation value. In yet another example, the method also includes determining a second deviation value for the detected object based on a comparison of the characteristic for the detected object and detailed map information describing expected features of the road and characteristics of the expected features; comparing the second deviation value to a second threshold deviation value for the expected characteristics of the expected features; when the second deviation value is outside of the second threshold deviation value, maneuvering the vehicle defensively.

A further aspect of the disclosure provides a method. The method includes receiving data from one or more sensors associated with a vehicle; detecting an object and a characteristic for the detected object based on the received data; determining, by a processor, a deviation value for the detected object based on a comparison of the characteristic for the detected object and detailed map information describing expected features of the road and characteristics of the expected features; comparing the second deviation value to a second threshold deviation value for the expected characteristics of the expected features; and identifying the mismatched area when the second deviation value is outside of the second threshold deviation value.

In one example, the characteristic includes a position of the detected object and the deviation value is determined by calculating a difference between the position of the detected object and an expected characteristic for position defined in the detailed map information. In another example, the characteristic includes a shape of the detected object and the deviation value is determined by calculating a difference between the shape of the detected object and an expected characteristic for shape defined in the detailed map information. In yet another example, the characteristic includes a size of the detected object and the deviation value is determined by calculating a difference between the size of the detected object and an expected characteristic for size defined in the detailed map information. In a further example, the method also includes detecting a second object and a second characteristic for the detected object based on the received data; determining a second deviation value for the second detected object based on a comparison of the second characteristic and the detailed map information; comparing the second deviation value to a second threshold deviation value for the expected characteristics of the expected features; when the deviation value is within the threshold deviation value and the second deviation value is outside of the second threshold deviation value, identifying a mismatched area; and maneuvering, without input from the driver, the vehicle to avoid the mismatched area. In still a further example, the method also includes detecting a second object and a second characteristic for the detected object based on the received data; determining a second deviation value for the second detected object based on a comparison of the second characteristic and the detailed map information; and before identifying the mismatched area, determining whether the second deviation value is within the second threshold deviation value.

Still a further aspect of the disclosure provides a device. The device includes memory storing traffic pattern model information including an expected range of values for a characteristic of objects in the road. The device also includes a processor coupled to the memory. The processor is configured to receive data from one or more sensors associated with a vehicle; detect an object and a characteristic for the detected object based on the received data; determine a deviation value for the detected object based on a comparison of the characteristic for the detected object to the traffic pattern model information; compare the deviation value to a threshold deviation value for the expected range of values for the characteristic of the given object; and when the deviation value is outside of the threshold deviation value, provide a notification to a driver.

In one example, the processor is also configured to slow the vehicle down if the driver does not take control after the notification is provided. In another example, the processor is also configured to maneuver the vehicle into a different lane if the driver does not take control after the notification is provided.

Another aspect of the disclosure provides a device. The device includes memory storing detailed map information describing expected features of the road and characteristics of the expected features. The device also includes a processor coupled to the memory. The processor is configured to receive data from one or more sensors associated with a vehicle; detect an object and a characteristic for the detected object based on the received data; determine a deviation value for the detected object based on a comparison of the characteristic and the detailed map information; compare the second deviation value to a threshold deviation value for the expected characteristics of the expected features; and when the deviation value is outside of the threshold deviation value, provide a notification to a driver of the vehicle.

In one example, the processor is also configured to slow the vehicle down if the driver does not take control after the notification is provided. In another example, the processor is also configured to when the deviation value is outside of the threshold deviation value, identify a mismatched area and to maneuver the vehicle to avoid the mismatched area if the driver does not take control after the notification is provided.

Yet another aspect of the disclosure provides a tangible computer-readable storage medium on which computer readable instructions of a program are stored. The instructions, when executed by a processor, cause the processor to perform a method. The method includes receiving data from one or more sensors associated with a vehicle; detecting an object and a characteristic for the detected object based on the received data; determining a deviation value for the detected object based on a comparison of the characteristic and traffic pattern model information, the traffic pattern model information including an expected range of values for a characteristic of objects in the road; comparing the deviation value to a threshold deviation value for the expected range of values for the characteristic of the given object; and when the deviation value is outside of the threshold deviation value, maneuvering, without input from a driver, the vehicle defensively.

A further aspect of the disclosure provides a tangible computer-readable storage medium on which computer readable instructions of a program are stored. The instructions, when executed by a processor, cause the processor to perform a method. The method includes receiving data from one or more sensors associated with a vehicle; detecting an object and a characteristic for the detected object based on the received data; determining a deviation value for the detected object based on a comparison of the characteristic for the detected object and detailed map information describing expected features of the road and characteristics of the expected features; comparing the second deviation value to a second threshold deviation value for the expected characteristics of the expected features; and identifying the mismatched area when the second deviation value is outside of the second threshold deviation value.

DETAILED DESCRIPTION

Figure 1:
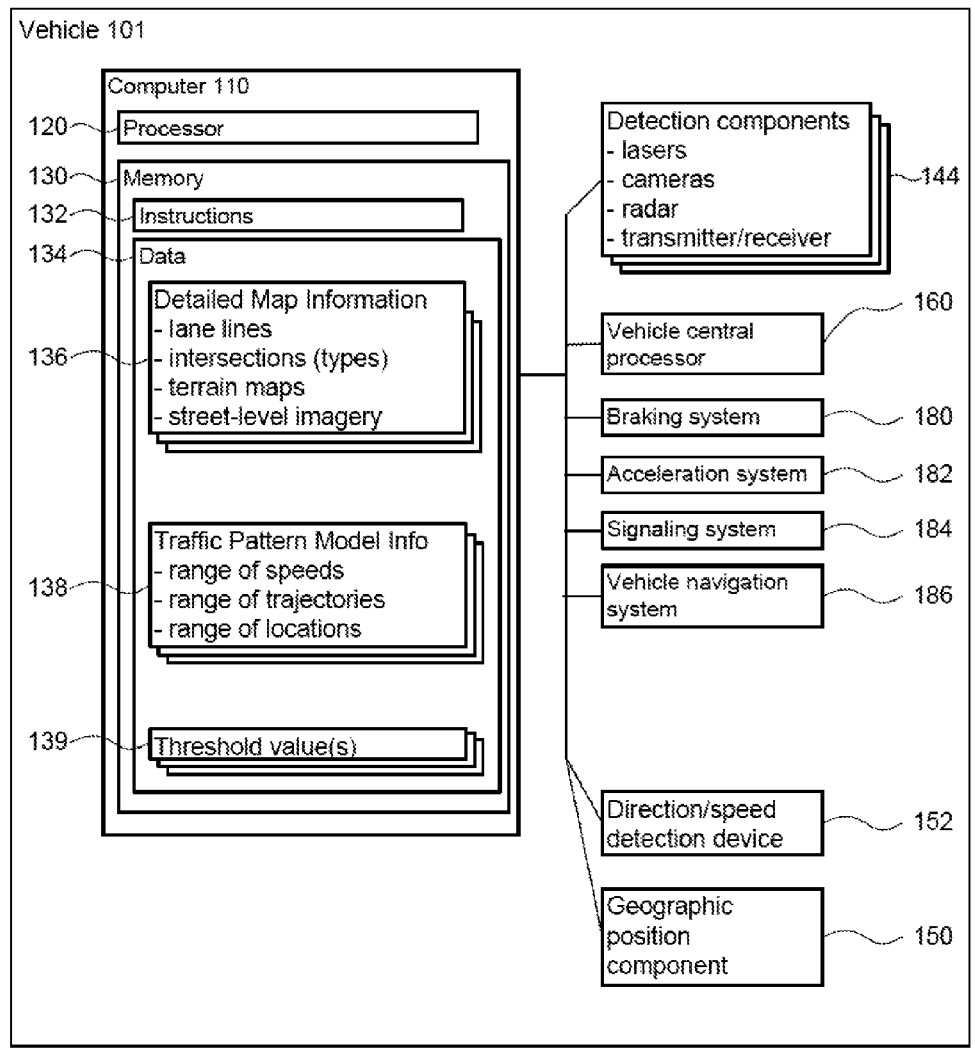
FIG. 1 is an example autonomous vehicle system in accordance with aspects of the disclosure.

As shown in FIG. 1, an autonomous vehicle system 100 in accordance with one aspect of the disclosure includes a vehicle 101 with various components. While certain aspects of the disclosure are particularly useful in connection with specific types of vehicles, the vehicle 101 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as a computer 110 containing a processor 120, memory 130 and other components typically present in general purpose computers.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components, acceleration and deceleration components, may each have their own processor that only performs calculations related to the component's specific function.

In various aspects described herein, the processor 120 may be located remotely from the vehicle 101 and communicate with the vehicle 101 wirelessly. In other aspects, some of the processes described herein are executed on a processor disposed within the vehicle 101 and others by a remote processor, including taking the steps necessary to execute a single maneuver.

The memory 130 stores information accessible by the processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods, and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The data may include environmental data that was obtained at a previous point in time and is expected to persist regardless of the vehicle's presence in the environment. For example, data 134 may include detailed map information 136, e.g., highly detailed maps detecting the shape and elevation of roadways, lane lines, intersections, crosswalks, speed limits, traffic signals, buildings, signs, real time traffic information, or other such features and information. These features may be persistent, for example, as described in more detail below, when the vehicle 101 approaches the location of a feature in the detailed map information, the computer 110 may expect to detect the feature. The detailed map information may also include explicit speed limit information associated with various roadway segments. The speed limit data may be entered manually or scanned from previously taken images of a speed limit sign using, for example, optical-character recognition. The detailed map information may also include two-dimensional street-level imagery, such as highly detailed image data depicting the surroundings of a vehicle from the vehicle's point-of-view. The detailed map information may also include three-dimensional terrain maps incorporating one or more of the objects listed above.

The detailed map information 136 may also include zone information, indicating zones that are unsuitable for driving autonomously. For example, an on-ramp, off-ramp, or other complicated or high traffic areas may be identified as such zones as a driver may feel the need to continuously monitor the vehicle in case the driver must take control. Other zones may be identified as unsuitable for any driving, such as a sidewalk, river, mountain, cliff, desert, etc.

Again, although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 2:
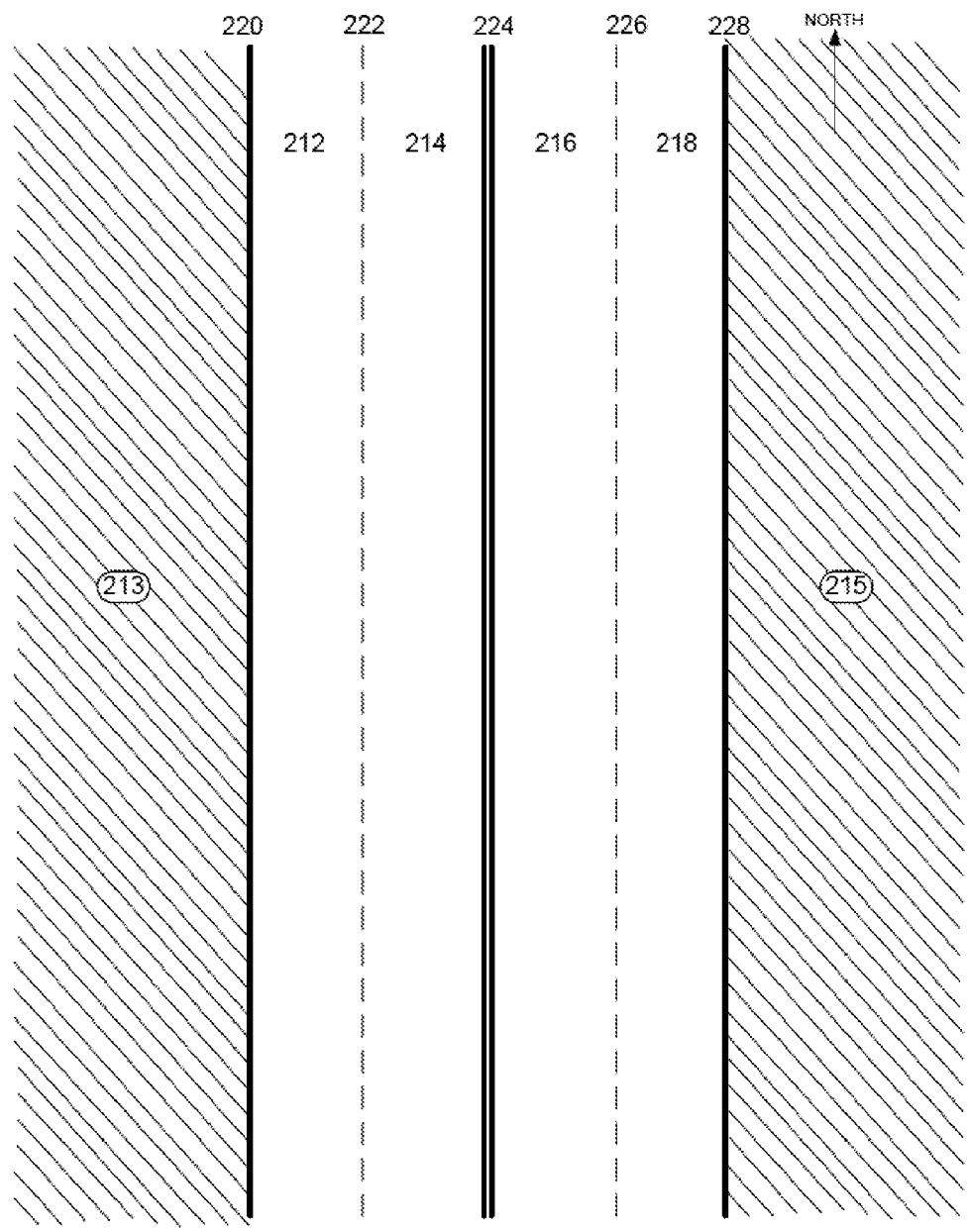
FIG. 2 is a diagram of example detailed map information in accordance with aspects of the disclosure.

FIG. 2 depicts a pictorial representation of detailed map information 136 corresponding to the features of a road 210, for example, those features which computer 110 may expect to detect while on road 210. Markers 220 and 228 represent boundaries on each of the sides of the road 210. Each boundary may be a curb, guardrail, highway divider, or other form of barrier. In some examples, the detailed map information 136 may identify each type of boundary differently. In the example of FIG. 2, for instance, the boundaries represented by markers 220 and 228 are both curbs.

Markers 222, 224, and 226 each represent lane lines painted on the surface of the road 210. Each lane line may be a double solid yellow line, single solid white line, single dashed white line, or other form of lane line. In some examples, the detailed map information 136 may identify each type of lane line differently. In the example of FIG. 2, for instance, the lane lines represented by markers 222 and 226 are single dashed white lines, indicating that vehicles may cross these lane lines in order to change lanes. The lane line represented by marker 224 is a double solid yellow line, indicating that vehicles may not cross this lane line in order to change lanes.

The detailed map information 136 may contain additional information regarding characteristics of the stored objects. For instance, the detailed map information may include information regarding the height of the curbs 220 and 228 (e.g., elevating 4 centimeters above the surface of the road 210). The detailed map information may include information regarding the width of each of the lane lines 222-226. Information regarding the width of lane lines 222 and 226, which are single dashed white lines, may indicate that each line has a width of 8 centimeters. Information regarding the width of lane line 224, which is a double solid yellow line, may indicate that this line has a width of 20 centimeters.

Shaded regions 213 and 215 each represent zones unsuitable for driving. In some examples, the detailed map information 136 may identify each type of zone differently (i.e., detecting a desert differently from a river). In the example of FIG. 2, for instance, the off-road regions represented by shaded areas 212 and 214 are a desert.

Data 134 may also include traffic pattern model information 138, e.g., a highly detailed model indicating the distribution of typical or expected speeds, trajectories, locations, accelerations/decelerations (changes in speed), or other such characteristics of vehicles or other moving objects on the locations of the detailed map information. This data may be generated, for example, by observing how vehicles, pedestrians, bicycles, etc. move at different locations in the detailed map information.

In some aspects, the traffic pattern model information may indicate information pertinent to the entire road. For example, the traffic pattern model information may indicate a range of speeds for vehicles travelling along the road 210 of FIG. 2, specific to each particular lane or independent of the lanes. The traffic pattern model information 138 may indicate a range of trajectories for vehicles travelling in particular lanes. For example, referring to FIG. 2, the range of trajectories for lane 218 may range from due north (driving straight in lane 218) to 10 degrees west of north (changing into lane 216). Similarly, the traffic pattern model information 138 may indicate a distribution of trajectories for vehicles travelling in lane 216 ranging from due north (driving straight in lane 216) to 10 degrees east of north (changing into lane 218).

Data 134 may also include one or more threshold deviation values 139. The threshold values may be set manually by an administrator based on the traffic pattern model information and the detailed map information in order to promote safe driving of the vehicle by computer. These threshold deviation values may indicate acceptable differences from the traffic pattern model information 138. For example, a threshold deviation value 139 may be set at 20 MPH lower than the slowest speed indicated by the traffic pattern model information 138. This would mean that if the traffic pattern model information 138 for the road 210 indicates that vehicles on the road 210 travel at speeds ranging between 50 MPH and 70 MPH, a threshold deviation value 139 for road 210 may be set at 30 MPH, 20 MPH lower than the slowest speed (50 MPH). In another example, a threshold deviation value 139 may be set 10 MPH higher than the fastest speed indicated by the traffic pattern model information 138. This would mean that given the same range of speeds as in the example above, a threshold deviation value may be set at 80 MPH, 10 MPH higher than the fastest speed (70 MPH).

In some aspects, one or more threshold deviation values 139 may correspond to characteristics of the features of the detailed map information 136. Thus, the threshold deviation values may indicate acceptable differences from the detailed map information. For example, a threshold deviation value 139 for the width of lane lines in the detailed map information may be set at 6 inches. Thus, if the detailed map information indicates that lane line 224 in the center of the road 210 is 18 inches wide, then a first threshold deviation value 139 for the lane line 224 may be set at 12 inches, 6 inches thinner than the lane line 224, and a second threshold deviation value 139 may be set at 26 centimeters, 6 inches wider than the lane line 224.

The threshold deviation values 139 may be stored in the data 134 with the traffic pattern model information 138 and/or detailed map information 136. Alternatively, the threshold deviation values 139 may be stored separately from the traffic pattern model information and the detailed map information 136.

In one example, computer 110 may be incorporated into vehicle 101. The vehicle 101 may also include one or more user interfaces for allowing communication between a driver of the vehicle 101 and the computer 110. The user interfaces may include status indicators, electronic displays, and user input devices built into the interior of the vehicle 101.

Figure 3:
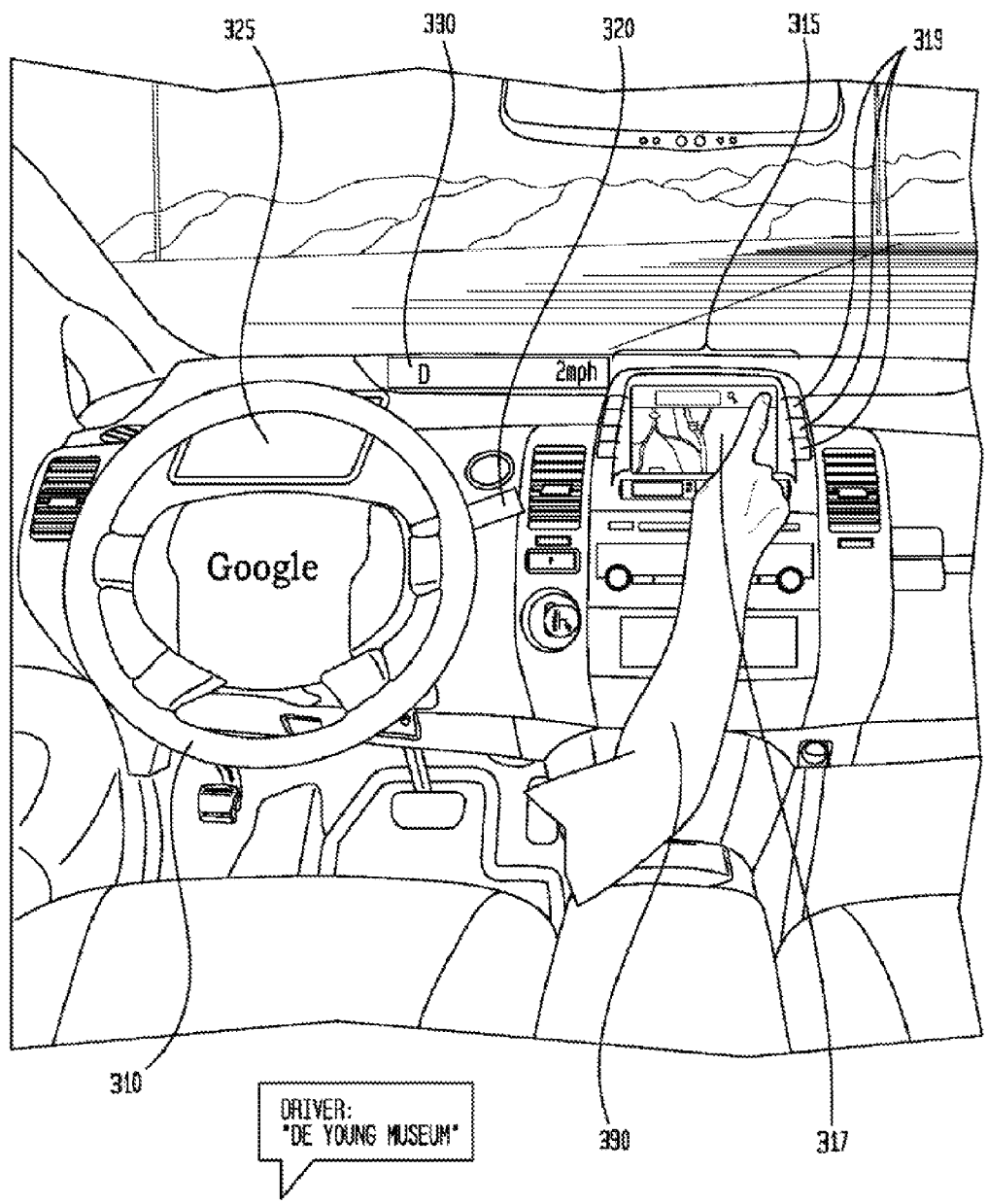
FIG. 3 is a diagram of an example interior of an autonomous vehicle.

FIG. 3 depicts a design of the interior of an autonomous vehicle. The autonomous vehicle 101 may include all of the features of a non-autonomous vehicle, for example: a steering apparatus, such as steering wheel 310; a navigation display apparatus, such as navigation display 315; and a gear selector apparatus, such as gear shifter 320. The vehicle may also have various user input devices, such as gear shifter 320, touch screen 317, or button inputs 319, for activating or deactivating one or more autonomous driving modes and for enabling a passenger or driver 390 to provide information, such as a navigation destination, to the computer 110.

Vehicle 101 may include one or more additional displays. For example, the vehicle may include a display 325 for displaying information regarding the status of the autonomous vehicle or its computer. In another example, the vehicle may include a status bar 330, to indicate the current status of vehicle 101. In the example of FIG. 3, status bar 330 displays "D" and "2 mph" indicating that the vehicle is presently in drive mode and is moving at 2 miles per hour (MPH). In that regard, the vehicle may display text on an electronic display, illuminate portions of vehicle 101, such as steering wheel 310, or provide various other types of indications.

Returning to FIG. 1, the computer 110 may be capable of communicating with various components of the vehicle 101. For example, the computer 110 may be in communication with the vehicle's central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle 101 may also have one or more components for detecting the status of the vehicle. For example, the vehicle 101 may include a geographic position component 150 in communication with the computer 110 for determining the geographic location of the device. The position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The location of the vehicle may also indicate whether the vehicle 101 is underground (e.g., detecting that the vehicle 101 is in a tunnel or a cave) or above ground.

The vehicle 101 may also include an accelerometer, gyroscope or other direction/speed detection device 152 to determine the direction and speed of the vehicle or changes thereto. By way of example only, the direction/speed detection device 152 may determine its pitch, yaw or roll (or changes thereto) relative to the direction of gravity or a plane perpendicular thereto. The direction/speed detection device 152 may also track increases or decreases in speed and the direction of such changes. The device's provision of location and orientation data as set forth herein may be provided automatically to the user, computer 110, other computers and combinations of the foregoing.

The vehicle may also be equipped with one or more sensors 144 for detecting objects external to the vehicle such as other vehicles, obstacles in the roadway, traffic signals, signs, trees, etc. The sensors 144 may include lasers, sonar, radar, cameras or any other detection devices which record data which may be processed by the computer 110.

Figure 4:
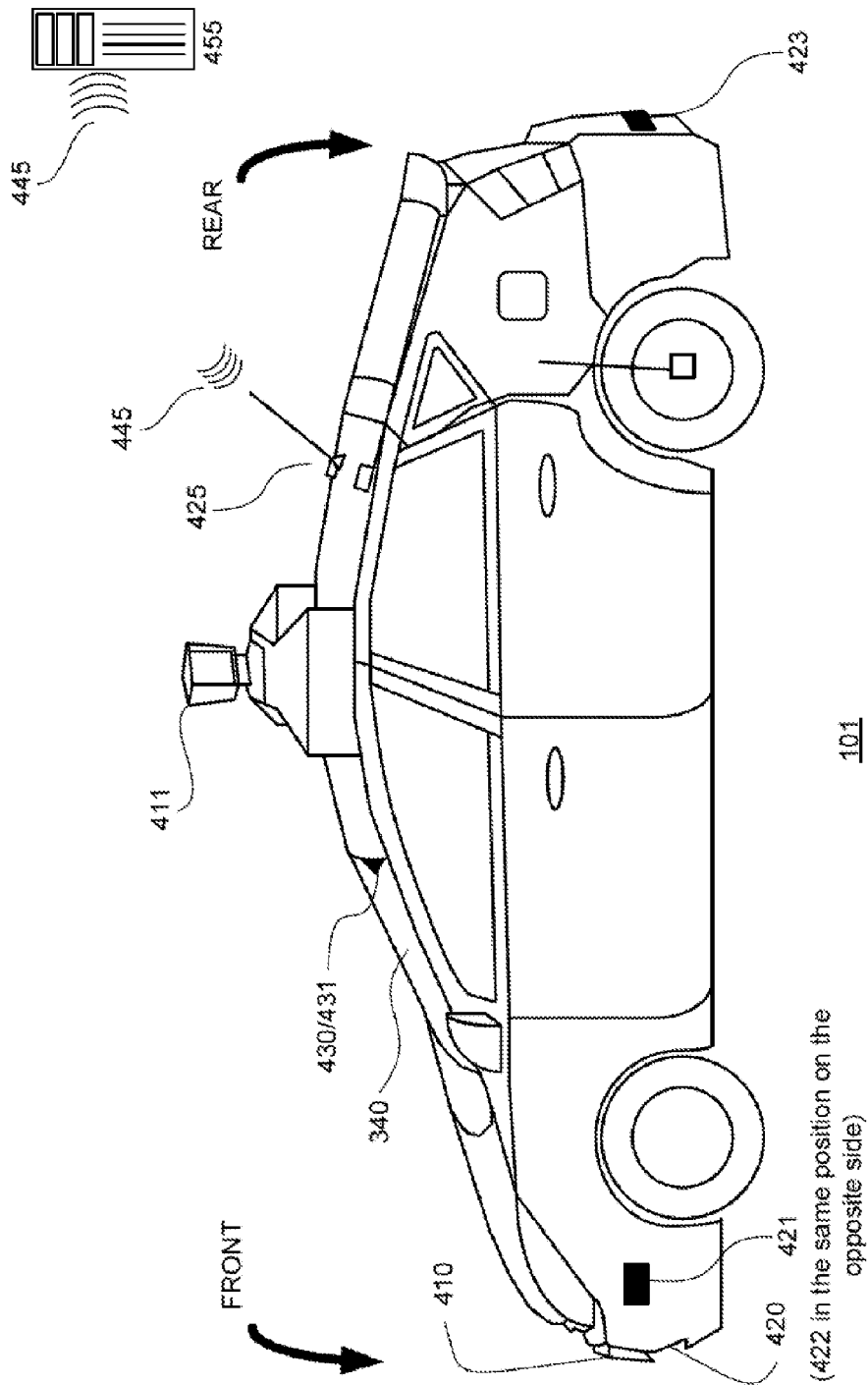
FIG. 4 is an example diagram of a vehicle in accordance with aspects of the disclosure.

The sensors 144 may be mounted on the vehicle 101 to collect information regarding the environment of the vehicle 101. As shown in FIG. 4, the vehicle 101 may include lasers 410 and 411, mounted on the front and top of the vehicle, respectively. In one example, laser 410 may have a range of 150 meters, a thirty degree vertical field of view, and a thirty degree horizontal field of view. In another example, laser 411 may have a range of 50-80 meters, a thirty degree vertical field of view, and a 360 degree horizontal field of view. Various other ranges and configurations of one or more lasers may also be used. The lasers 410/411 may provide the vehicle 101 with range and intensity information which the computer may use to detect the location and distance of various objects that absorb/reflect energy from the lasers 410/411. In one aspect, the lasers 410/411 may measure the distance between the vehicle 101 and the object surfaces facing the vehicle by spinning on its axis and changing its pitch.

The vehicle 101 may also include various radar units, such as those used for adaptive cruise control systems. The radar units may be located on the front and back of the vehicle 101 as well as on either side of the front bumper. As shown in the example of FIG. 4, vehicle 101 includes radar units 420-423 located on the side (only one side being shown), front and rear of the vehicle. In one example, each of these radar units may have a range of 200 meters for an 18 degree field of view as well as a range of 60 meters for a 56 degree field of view. Various other ranges and configurations of one or more radar units may also be used.

A variety of cameras may also be mounted on the vehicle 101. The cameras may be mounted at predetermined distances so that the parallax from the images of 2 or more cameras may be used to compute the distance to various objects. As shown in FIG. 4, the vehicle 101 may include 2 cameras 430-431 mounted under a windshield 340 near the rear view mirror (not shown). In one example, camera 430 may include a range of 200 meters and a 30 degree horizontal field of view, while camera 431 may include a range of 100 meters and a 60 degree horizontal field of view. Various other ranges and configurations of one or more cameras may also be used.

The vehicle 101 may also include a transmitter and receiver 425. The transmitter/receiver 425 may receive and transmit information wirelessly according to various communications protocols, such as cellular (e.g. 3G, 4G) or WiFi (e.g. 802.11, 8021b, g, n, or other such standards). The transmitter/receiver 425 may also allow for inter-vehicle communication. The transmitter/receiver may also communicate with roadside sensors, such as a camera or laser stationed on the side of a road. As shown in FIG. 4, the transmitter/receiver 425 may be connected to a server computer 455 (having a processor, memory, and instructions, not shown) via a wireless network 445. The server computer 455 may store information used by the computer 110 when controlling the vehicle 101. Such information may include maps, information about traffic patterns, road conditions, and so forth. The server computer 455 may receive from vehicle 101 (via transmitter/receiver 425) map updates, map corrections, traffic pattern updates, traffic pattern corrections, as well as other information. The server computer 455 may store the received information in memory and/or transmit the information among other autonomous vehicles on the road.

The aforementioned sensors 144 may allow the vehicle 101 to evaluate and potentially respond to its environment in order to maximize safety for the driver, other drivers, as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors 144 described above, the computer 110 may also use input from sensors typical of non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors 144 may continuously update their output to reflect the environment being sensed at or over a range of time, and continuously or as-demanded provide that updated output to the computer so that the computer can determine whether the vehicle's then-current direction or speed should be modified in response to the sensed environment.

Operations in accordance with aspects of the disclosure will now be described with reference to the figures. It should be understood that the following operations do not have to be performed in the precise order described below. Rather, various operations can be handled in a different order or simultaneously. It should also be understood that these operations do not have to be performed all at once. For instance, some operations may be performed separately from other operations.

The computer 110 of autonomous vehicle system 100 may maneuver the vehicle 101 autonomously or semiautonomously. For example, the computer 110 may receive information from the sensors 144 and positioning components 150, 152. This received information may be used to identify the location of the vehicle 101. The location may be used to identify relevant portions of the detailed map information 136, traffic pattern model information 138, etc. In some examples, the vehicle may use the detailed map information 136 to refine its location estimate, for example, by comparing the location of objects detected from the sensor data to the detailed map information. Using the sensor data as well as the stored detailed map information 136, the computer 110 may also control the movement, speed, etc. of vehicle 101. This may include taking actions such as activating a brake for braking 180, an accelerator for acceleration 182, or controlling the steering without continued input from a driver.

Figure 5:
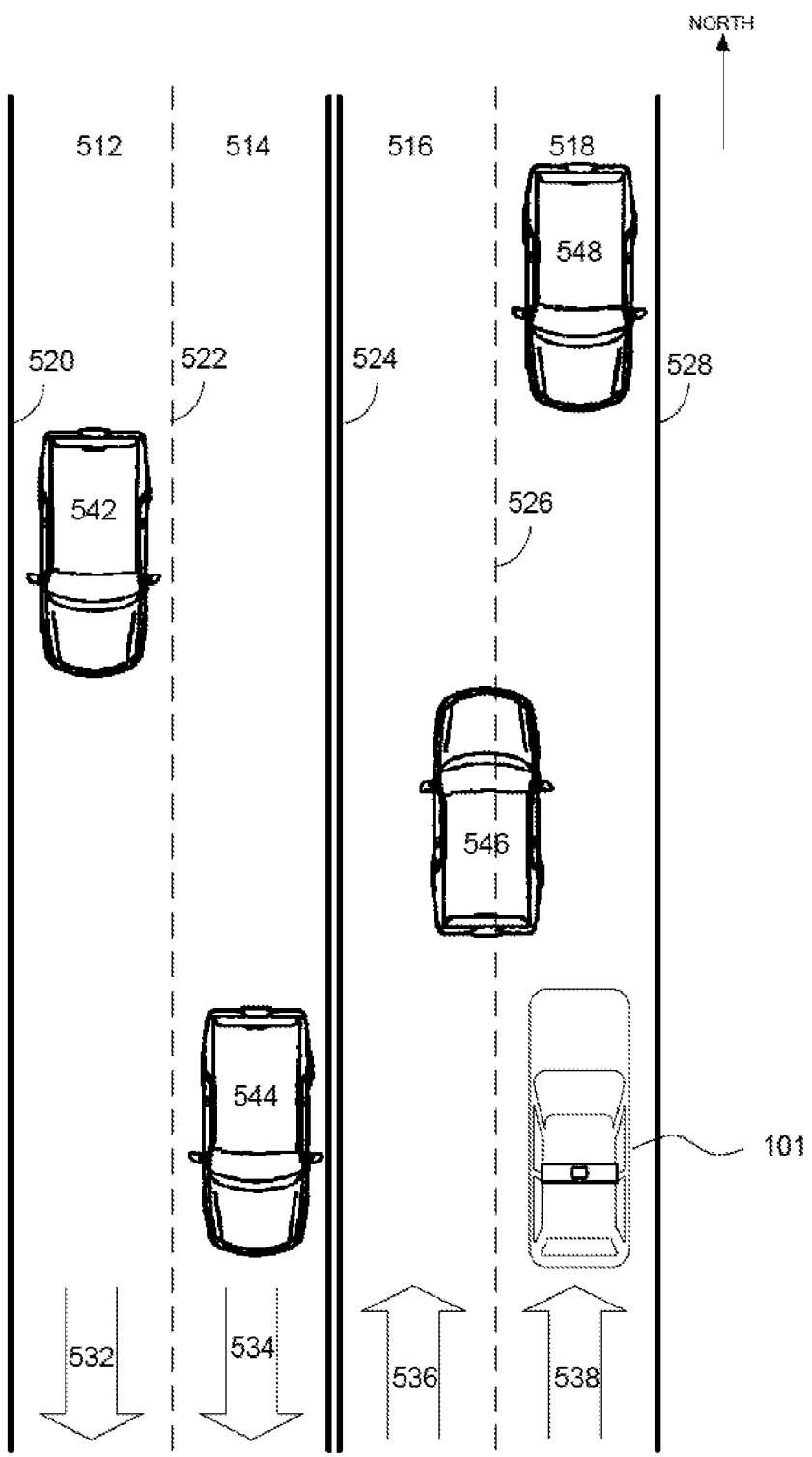
FIG. 5 is an example of a road in accordance with aspects of the disclosure.

In the example of FIG. 5, the computer 110 maneuvers the vehicle 101 along the road 210 discussed above with regard to the detailed map information of FIG. 2. In this example, lanes 512 and 514 of the road 210 are designated for southbound traffic, as indicated by direction arrows 532 and 534 (not necessarily present on the road). Lanes 516 and 518 are designated for northbound traffic, as indicated by direction arrows 536 and 538 (also not necessarily present on the road). Lane lines 522, 524, and 526 indicate the boundaries between lanes 512-518 while curbs 520 and 528 establish boundaries for each side of the road 210. In addition to the features of road 210 described with regard to FIG. 2 above, in this example, FIG. 5 includes several other vehicles driving on road 210. For example, vehicle 542 is driving south in lane 512, vehicle 544 is driving south in lane 514, vehicle 546 is driving north mostly in lane 516 (but partially in lane 518), and vehicle 548 is driving south (against the flow of traffic) in lane 518.

The computer 110 may process the data received from the sensors to detect objects and/or features of the road. The sensor data may be continuously received by the computer 110, such that the computer may detect the presence of an object at different times. In addition to detecting the presence of an object, the vehicle may determine a set of characteristics. As the data is taken at different times, these characteristics may include, for example, the locations, speeds, trajectories, types of object, etc. In some examples, the computer 110 may also compare the characteristics and/or sensor data to the detailed map information 136 to increase the accuracy of these determinations.

Figure 6:
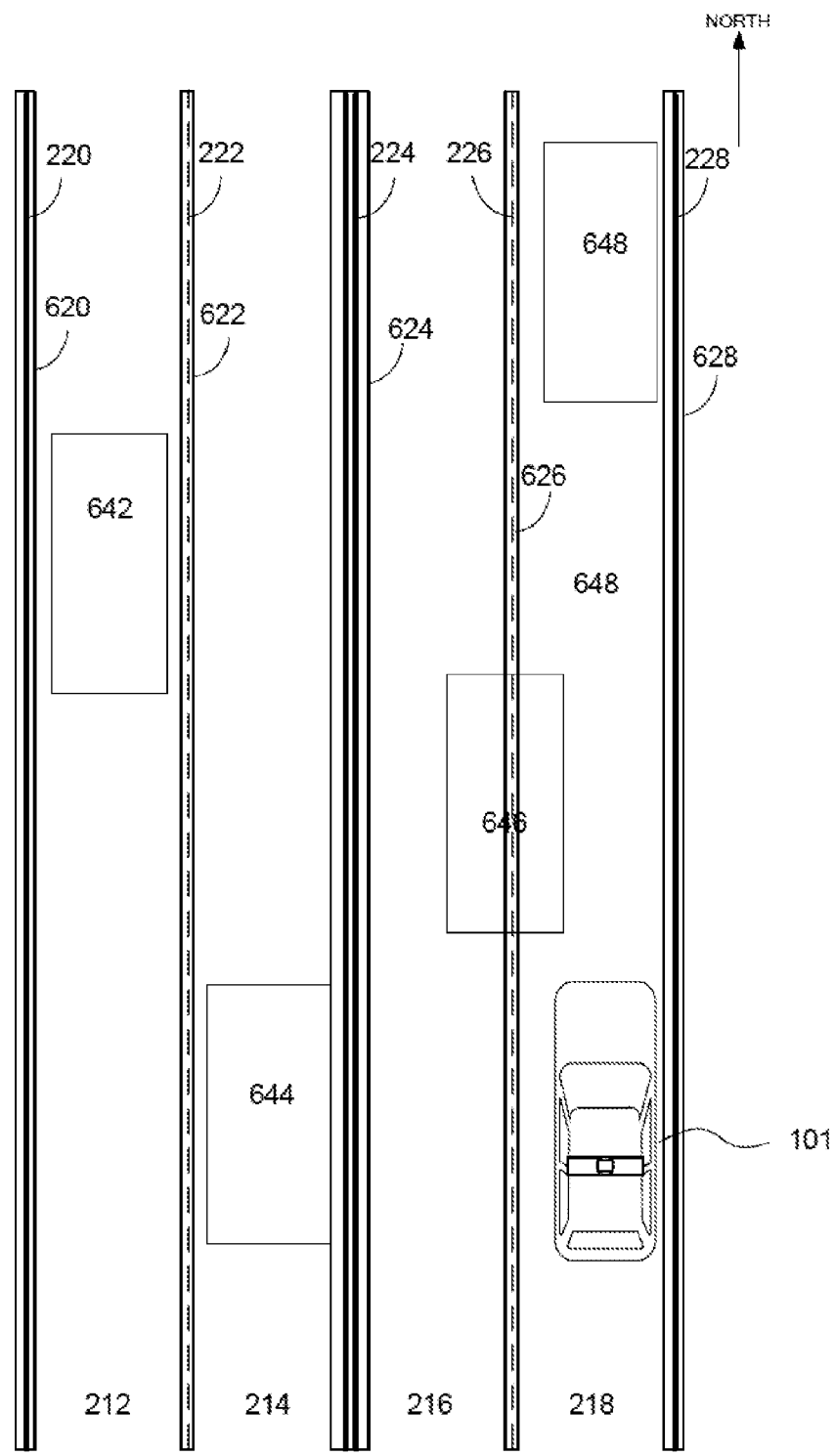
FIG. 6 is example data in accordance with aspects of the disclosure.

For example, FIG. 6 is a pictorial representation of the objects detected by the computer 110 from the sensor data as compared to the map information from FIG. 2 for roadway 210. For ease of understanding, FIG. 6 depicts the detected objects 620-648 overlaid with detailed map information for the road 210. In this example, objects 622, 624, and 626, represent the computer's detection of the presence of lane lines 522, 524, and 526 (show in FIG. 5), while objects 620 and 628 represent the computer's detection of the presence of curbs 520 and 528 (shown in FIG. 5). For example, the curb 520 may be detected by the sensors. The computer may process the sensor data and identify object 620. In this example, object 620 is represented by a bounding box approximating the location and shape of curb 520 based on the sensor information. Similar processing may be conducted for each of the objects 522, 524, 526, and 528. Using a similar analysis, the computer 110 may also identify objects 642, 644, 646, and 648 representing vehicles 542, 544, 546, and 548 (shown only in FIG. 5). In this example, the location of objects 620, 622, 624, 626, and 628 generally line up with the location of objects 220, 222, 224, 226, and 228 of the map information.

If the sensor data is collected over a period of time, the computer 110 may also determine that objects 620, 622, 624, 626, and 628 are stationary, while objects 642, 644, 646, and 648 are moving. In addition to the location of these objects, the computer 110 may also determine other characteristics such as the speed, trajectory, and possible type (vehicle, pedestrian, bicycle, etc.) of these objects from the sensor data. As noted above, the computer 110 may also compare the characteristics and/or sensor data to the detailed map information 134 to increase the accuracy of these determinations. For example, given the size, speed, direction, and location of 642, 644, 646, and 648, the computer 110 may determine that these objects are likely to be other vehicles.

The computer may compare the characteristics of the detected objects to traffic pattern model information 138 in order to determine a deviation value. One or more characteristics in the traffic pattern model information 138 for the relevant road may be compared to one or more characteristics of a detected object. Based on this comparison, the computer 110 may calculate a deviation value representing the deviation between one or more characteristics of the detected object and one or more characteristics of the traffic pattern model information.

In one aspect, a characteristic of the traffic pattern model information for a particular section of road may indicate that vehicles (or simply moving objects) on this particular section of road 210 typically drive within a range of speeds. This may be compared to the speed of detected objects which are likely to be vehicles (or simply moving objects) in the road. Using the examples of road 210 and FIG. 6, a characteristic of the traffic pattern model information 138 for road 210 may indicate that vehicles (or simply moving objects) typically move between 60 and 70 MPH. The computer 110 may determine or calculate a deviation value (here a difference in speeds) between the speed of each of the objects likely to be vehicles (here, 642, 644, 646, and 648) and the range of speeds in the traffic pattern model information (50-70 MPH). In an example, computer 110 may determine that objects 646 and 648 are driving at approximately 15 and 20 MPH, respectively. In this example, the deviation values for each of objects 646 and 648 may be 35 and 30 MPH, respectively, or −35 and −30 MPH.

In another aspect, a characteristic of the traffic pattern model information for a particular section of road may indicate how vehicles typically drive on the road, for example, between curbs or between lane lines heading in the direction of the lanes. In other words, a vehicle in a northbound lane should be driving north. This may be compared to the location and trajectory of the detected objects which are likely to be vehicles or simply moving objects in the road. Returning to the example of road 210 and the features of FIG. 6, a characteristic of the traffic pattern model information 138 may indicate traffic pattern model information that vehicles typically drive between lane lines in lanes. Specifically, vehicles located in the rightmost lane 218 of the road 210 typically drive with a trajectory in a range between due north (i.e., when driving straight in lane 216) and 10 degrees west of due north (i.e., when shifting from lane 218 to lane 216). The locations and trajectories of each of the objects likely to be vehicles (here, 642, 644, 646, and 648) may be compared to the typical locations and trajectories of vehicles moving on road 210. For example, computer 110 may determine that object 646 is not fully between lane lines 224 and 226 or 226 and 228, with a trajectory of north. In this example, the deviation value for the location of each of objects 646 may be approximately 1 meter or 2 meters as object 646 may be approximately 1 meter from the center of lane 216 or 2 meters from the center of lane 218. In another example, object 648 is within lane lines 226 and 228, and moving with a trajectory of south. In this example, the range of trajectories may be from 10 degrees west of north to 10 degrees east of north, and the deviation value may be 170 degrees.

The deviation values may be compared to the threshold deviation values 139 for the relevant characteristic or characteristics. For example, the computer 110 may determine whether a particular deviation value is within some relevant threshold deviation value or values from the typical range of characteristics for similar objects on the same road. Thus, threshold deviation values for trajectories may be compared to deviation values for trajectories, threshold deviation values for locations may be compared to deviation values for locations, and so on. In this regard, the computer 110 not only compares the detected objects and characteristics to the traffic pattern model information 138, but also determines whether these characteristics fall within an acceptable deviation from the typical values. This may allow computer 110 to determine the actual traffic conditions proximate to vehicle 101 in real time.

Returning to the example of FIG. 6, objects 646 and 648 may be moving at approximately 15 and 20 MPH. In this example, the computer 110 may compare the determined deviation values, 35 and 30 MPH or −35 and −30 MPH, respectively, to the threshold deviation values for speed of vehicles on road 210. If the threshold deviation value is ±32 MPH, then the deviation value of object 646 is less than the threshold deviation value while the deviation value of object 648 is greater than the threshold deviation value. This may indicate that object 646 is not within the acceptable range of speeds for road 210, while object 648 is within the acceptable range of speeds for road 210. If the deviation value is no more than 20 MPH below the typical range (50-70 MPH) and no greater than 10 MPH above the typical range, the deviation values of both objects 646 and 648 are outside of this acceptable range. In these examples, both vehicles may be driving relatively slowly as compared to the typical speeds for vehicles on road 210. This may be indicative of heavy traffic, congestion, temporary roadwork, a broken down vehicle, etc.

When determining the relevant threshold deviation value, multiple characteristics of an object may be compared. For example, returning to the example of FIG. 6, object 646 is not between lane lines 224 and 226 or between lane lines 226 or 228, with a trajectory of north. In this example, the deviation value for object 646 may be approximately 1 meter or 2 meters as object 646 may be approximately 1 meter from the center of lane 216 or 2 meters from the center of lane 218. Because the trajectory of vehicle 646 is north, the deviation value for the location of a vehicle within lane lines 224 and 226 or 226 and 228 may be only a few, for example 1-2, feet. Thus, object 646 may be outside of the acceptable ranges. If the trajectory of the vehicle 646 is at least 15 degrees from north, this may indicate that vehicle 646 is changing lanes and thus the acceptable deviation value for location may be higher (for example the width of an entire lane).

In another example, object 648 is within lane lines 226 and 228, and moving with a trajectory of south. As object 646 is within lane lines 226 and 228, the deviation value may be 170 degrees and the threshold deviation value for vehicles traveling between lane lines 226 and 228 may be 40 degrees from 10 degrees west of north or 10 degrees east of north. Thus, in this example, object 648 may be outside of the acceptable range.

In addition to comparing the characteristics of a single detected object to the traffic pattern information, the computer may process characteristics of multiple objects. For example, returning to the example of objects 646 and 648 moving relatively slowly, the computer 110 may look at the characteristics for both vehicles and compare them to threshold deviation values for multiple objects. In this example, the relatively slow speeds of both vehicles may indicate a traffic jam.

The above examples are examples of situations in which the computer 110 may determine that a deviation value is outside of the relevant threshold deviation value. The computer 110 may determine that a deviation value is outside of a threshold deviation value 139 in other situations, such as those in which a driver of the vehicle 101 would feel uncomfortable or feel the need to take control of the vehicle 101.

If the computer 110 determines that the deviation value does not exceed the relevant threshold deviation value 139, the computer 110 may continue to maneuver the vehicle autonomously or semiautonomously. Alternatively, if the computer 110 determines that the deviation value exceeds the relevant threshold deviation value, the computer 110 may generate and provide an alert to the driver. The alert may request the driver take control of the vehicle 101. The alert may be an aural signal, a visual signal, and/or any other signal that gets the attention of the driver.

After alerting the driver, the autonomous vehicle system 100 then receives input from the driver. For example, the driver may take control of the vehicle 101 by turning the steering wheel, applying the brake, applying the accelerator, pressing an emergency shut-off, etc. If the computer 110 does not receive input (or sufficient input) from the driver, the computer 110 may navigate the vehicle 101 to the side of the road (i.e., pull the vehicle over), reduce the speed of the vehicle 101, or bring the vehicle 101 to a complete stop.

In another example, rather than notifying the driver and requiring the driver to take control of the vehicle, the computer 110 may take some other action. For example, computer 110 may take a defensive action, such as slowing down vehicle 101 or giving a larger distance between vehicle 101 and other objects. This may be especially useful under conditions such as very slow traffic where disengaging the autonomous mode may not actually be necessary. The computer may also maneuver the vehicle in order to change lanes to avoid whatever the problem may be.

In addition to taking all or some of the actions described above, the computer may also log the sensor data and traffic information for later examination. For example, this information may be transmitted to a reporting server, such as server 455, for quality control review. Server 455 may also send the information to other autonomous or non-autonomous vehicles. Alternatively, the computer 110 may transmit this information directly to other vehicles. This may allow for a vehicle's computer to directly identify traffic conditions, react to them, and share them with other vehicles without requiring action from the driver.

Figure 7:
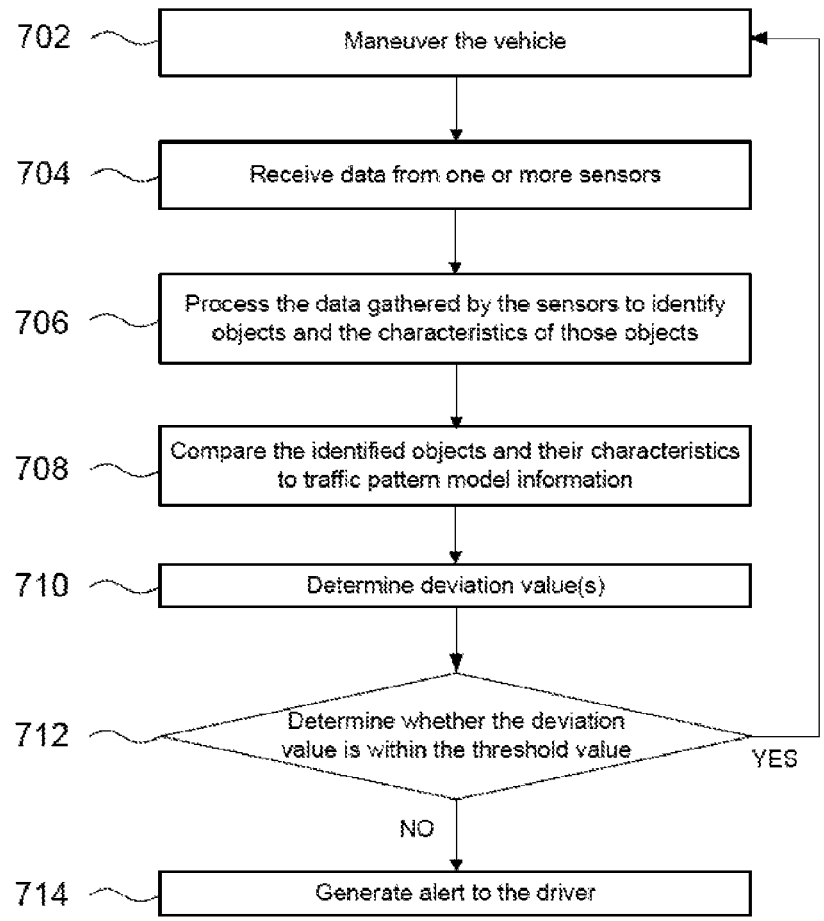
FIG. 7 is a flow diagram in accordance with aspects of the disclosure.

FIG. 7 illustrates an example flow chart 700 in accordance with some of the aspects described above. In block 702, the computer 110 maneuvers the vehicle. The computer 110 receives data from one or more sensors at block 704. For example, as described above, the computer 110 may receive information from a laser, camera, radar unit, etc. The computer processes the sensor data to detect one or more objects and one or more characteristics of those one or more objects at block 706. For each detected object, the computer 110 compares the one or more characteristics of the detected object to traffic pattern model information at block 708. For example, a characteristic for speed of an object may be compared to a typical speed of objects from the model. The computer 110 then determines a deviation value for the compared characteristics at block 710. The computer then determines whether the deviation values are within threshold values for the relevant characteristics at block 712. If so, the computer 110 continues to maneuver the vehicle at block 702, for example, based on the received sensor data. Returning to block 714, if the deviation values are not within the relevant threshold deviation values at block 712, the computer 110 generates an alert to the driver at block 714. For example, as described above, the computer 110 may cause a message to be displayed or played to the driver to inform him or her of the need to take control of the vehicle.

Figure 8:
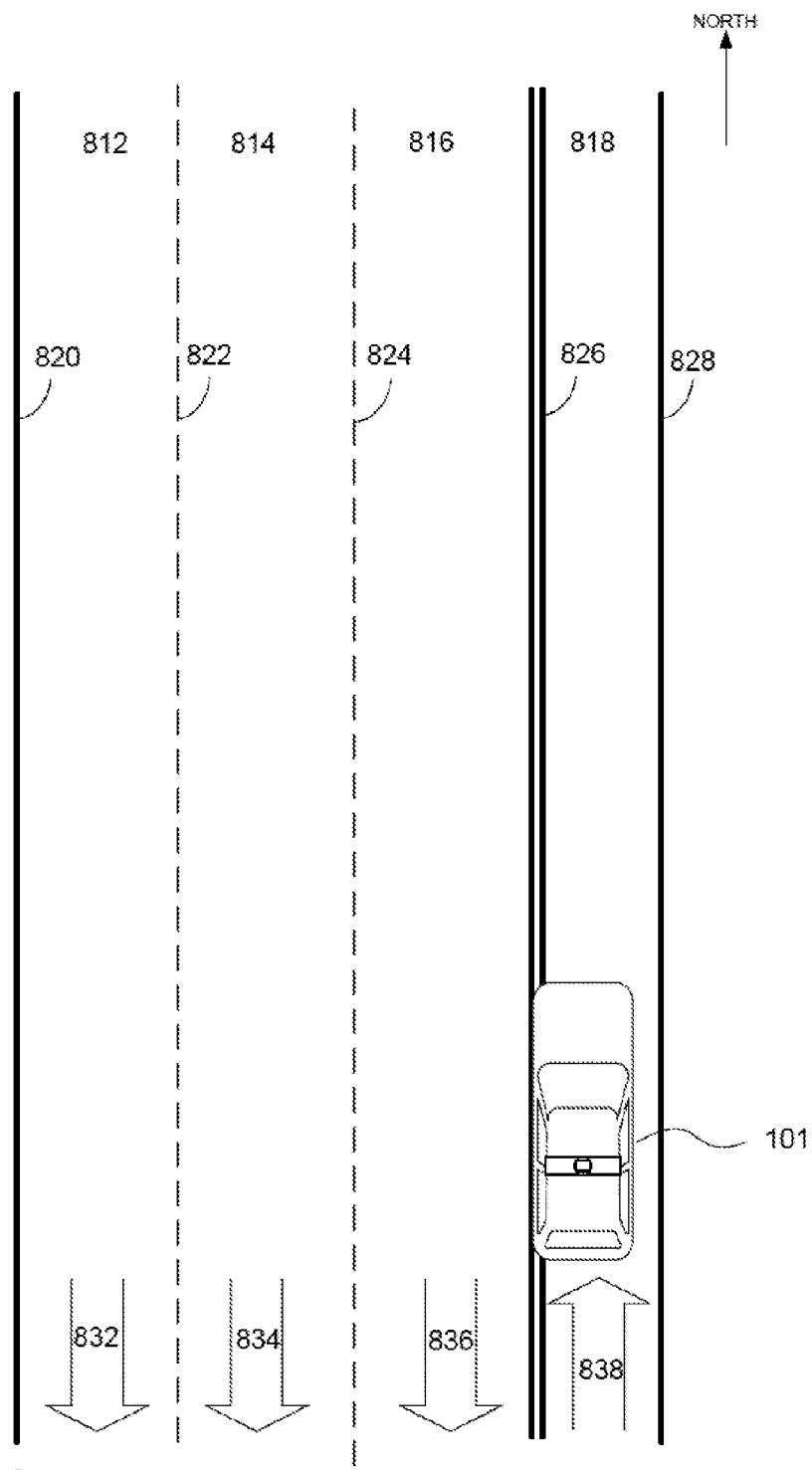
FIG. 8 is an example of a road in accordance with aspects of the disclosure.

In other aspects, once the computer 110 has detected the presence of objects and determined one or more characteristics for the objects, the computer 110 may compare the characteristics of the detected objects to detailed map information 136 in order to determine whether there is a mismatch between the collected sensor data and the detailed map information 136. This may be especially useful when the characteristics of the road have changed and have not yet been updated in the detailed map information. For example, FIG. 8 depicts a road 810 corresponding to the same location as road 210. The lanes of the road 210 may be repositioned, for example, by repainting the lane lines of road 210 to change the characteristics of the road. In this example, road 810 may include four lanes, 812, 814, 816, and 818. Each of these lanes may be associated with a respective traffic directions, direction arrows 832, 834, 836 in the south bound direction and direction arrow 838 in the north bound direction. As with the examples of direction arrows 532, 534, 536, and 538, these features, 832, 834, 836 and 838, are not necessarily present on the road 810. The positions for the lane line 222 and boundaries 220 and 228 on the road 210 (all shown in FIG. 2) are identical to the positions of the lane line 822 and the boundaries 820 and 828 on road 810 (shown in FIG. 8). The single lane line 226 and the double lane lines 224 of FIG. 2 have been removed from the surface of the road 810 in FIG. 8. In place of the removed lane lines, double lane lines 826 have been added to the surface of road 810 one meter to the right of the previous location of lane line 226, and a single lane line 824 has been added to the surface of the new road 810 a half meter to the right of the previous location of lane line 224.

As noted above, the computer 110 may detect objects from the sensor data and the locations of the detected objects. The computer 110 may then compare the detected objects and associated locations to the detailed map information. As described above with regard to FIG. 2, the detailed map information 136 for a particular section of road, such as road 210, may indicate the positions of stationary objects such as lane lines for the particular section of road which the computer 110 may expect to observe or detect from the sensor data.

Figure 9:
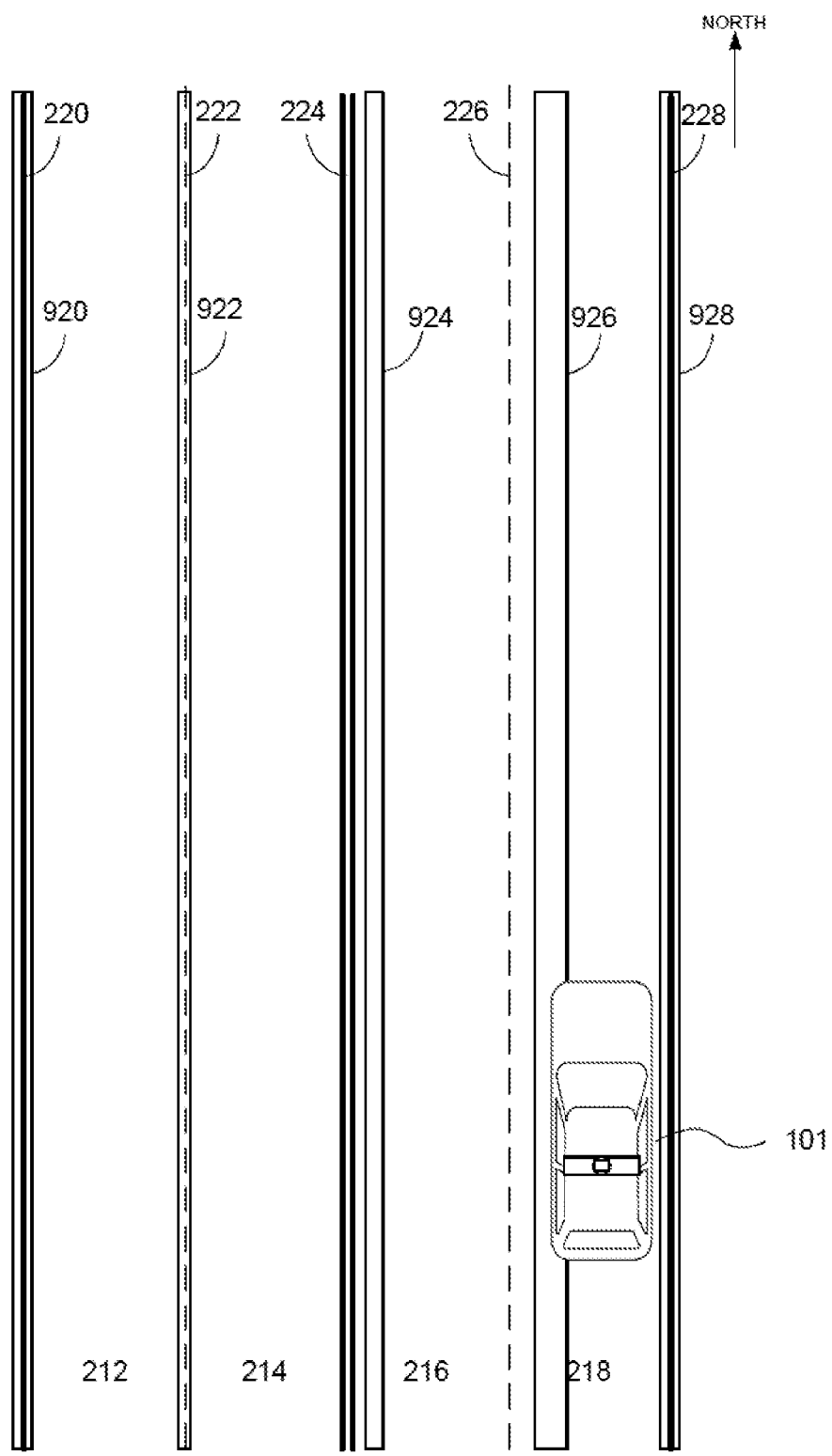
FIG. 9 is example data in accordance with aspects of the disclosure.

FIG. 9 is a pictorial representation of the objects detected by the computer 110 from the sensor data while driving along road 810 or what the computer 110 identifies as road 210 based on the vehicle's location. In this example, detected objects 920, 922, 924, 926, and 928 are overlaid with detailed map information for the road 210. In this example, while the data for the detected objects 920, 922, 924, 926, and 928 may reflect the changes made to road 210, the detailed map information 136 may not reflect these changes if the detailed map information 136 has not been updated since the road 210 was changed.

Based on this comparison, the computer 110 may calculate a deviation value representing the difference from or deviation in position of the detected objects and features of the detailed map information 136. In this example, the computer 110 may calculate a deviation value (here a difference in positions) between the position of each of the detected objects 920-928 and the positions of the objects 220-228 in the detailed map information 136. For each of the detected objects 920-928, a separate deviation value may be calculated between the object and each of the objects 220-228 or between the position of the detected objects 924 and 926 relative to features with similar shape, location, and/or size characteristics. In this example, object 924 may be compared to the closest feature of road 210, or double lane lines 224. Thus, the characteristics of object 924 may be compared with the characteristics of double lane lines 224. If the object 924 is 2 feet from double lines 224, the deviation value for the location of object 924 may be 2 feet. Similarly, object 926 may be compared to the closest feature of road 210, or lane line 226. In this case, the deviation value for the object 926 may be 3 feet from lane line 226.

In some examples, in addition to calculating a deviation value for position, the computer 110 may calculate a deviation value (here a difference in shape) between the shape of each of the detected objects 920-928 and the shapes of the objects 220-228 in the detailed map information 136. For each of the detected objects 920-928, a separate deviation value may be calculated between the characteristics of each detected object and each of the features of the map information with similar shape, location, and/or size characteristics. Returning to the example of FIG. 9, detected object 924 may actually be a lane line with a detected width of approximately 6 inches, and object 926 may actually be a double lane line with a detected width of 18 inches. In this example, the deviation values for the detected object 924 may be zero (or negligibly small) when compared to the shape of objects 222 and 226 (also having a width of 6 inches), and 12 inches when compared to the shape of object 224 (having a width of 18 inches, 12 inches greater than the detected width of object 924). Similarly, the deviation values for the detected object 926 may be zero when compared to the shape of object 224, but may be 12 inches when compared to the shape of objects 222 and 226.

The deviation values may be compared to the threshold deviation values 139 for the relevant characteristics of the feature or features of the detailed map information. For example, the computer 110 may determine whether a particular deviation value 139 is within an acceptable threshold deviation value or values from the features of the detailed map information. For example, the threshold deviation value for the location of lane lines may be a few inches or a foot whereas the threshold deviation value for double lane lines may be more or less. Returning to the example of calculating deviation values for the positions of detected objects 924 and 926, with deviation values of 2 feet and 3 feet, respectively, both of these objects are not within the threshold deviation values for double lane line 224 or lane lines 226. Thus, these detected objects may not be within the acceptable range of locations for the double lane lines 224 and lane lines 226.

When determining the relevant threshold deviation value, the threshold deviation value for one characteristic of the object may be affected by a deviation value for a second characteristic of the object. For example, returning to the example of FIG. 9, detected object 924 may be within the acceptable range of locations to be detected as lane line 224 if the threshold deviation value 139 for the location of an object is 2 feet. However, detected object 924 may not have the same size and shape characteristics as lane line 224. In this example, if the threshold deviation value 139 for the shape of lane lines (such as lane line 226 or double lane line 224) is 6 inches, then the deviation value for the shape of detected object 924, compared to double lane line 224, may be greater than or not within of the threshold deviation value 139.

In addition to comparing the characteristics of a single detected object to the detailed map information, the computer may process characteristics of multiple objects. For example, returning to the example of objects 924 and 926, the computer 110 may look at the characteristics for both lane lines and compare them to threshold deviation values for multiple objects. In this example, the mismatch between the positions and shapes of these lane lines and the positions and shapes of the objects in the detailed map information may indicate a significant change in road 210.

The above examples are examples of situations in which the computer 110 may determine that a deviation value is outside of the relevant threshold deviation value. In other words, there is a mismatch between the map information and the actual world. The computer 110 may determine that a deviation value is outside of a threshold deviation value in other situations, such as those in which the computer 110 cannot detect objects on a road that correspond with objects featured in the detailed map information 136.

If the computer 110 determines that the deviation value is within the relevant threshold deviation value 139, the computer 110 may continue to maneuver the vehicle 101 autonomously or semiautonomously. Alternatively, if the computer 110 determines that the deviation value exceeds the relevant threshold deviation value 139, the computer 110 may generate and provide an alert to the driver. The alert may request the driver take control of the vehicle 101. As noted above the alert may be an aural signal, a visual signal, and/or any other signal that gets the attention of the driver.

Again, after alerting the driver, the computer 110 may then receive input from the driver. For example, the driver may take control of the vehicle 101 by turning the steering wheel 310, applying the brake, applying the accelerator, pressing an emergency shut-off, etc. If the computer 110 does not receive input (or sufficient input) from the driver, the computer 110 may navigate the vehicle 101 to the side of the road (i.e., pull the vehicle over), reduce the speed of the vehicle 101, or bring the vehicle 101 to a complete stop.

As noted above, rather than notifying the driver and requiring the driver to take control of the vehicle, the computer 110 may take some other action such as slow down vehicle 101 or avoid the mismatched area by driving around it (if possible). In addition to taking all or some of the actions described above, the computer may also log the sensor data and mismatch information for later examination. For example, this information may be transmitted to a reporting server, such as server 455, for quality control review. Server 455 may also send the information to other autonomous or non-autonomous vehicles. Alternatively, the computer 110 may transmit this information directly to other vehicles. This may allow for a vehicle's computer to directly identify mismatch conditions, react to them, and share them with other vehicles without requiring action from the driver.

Figure 10:
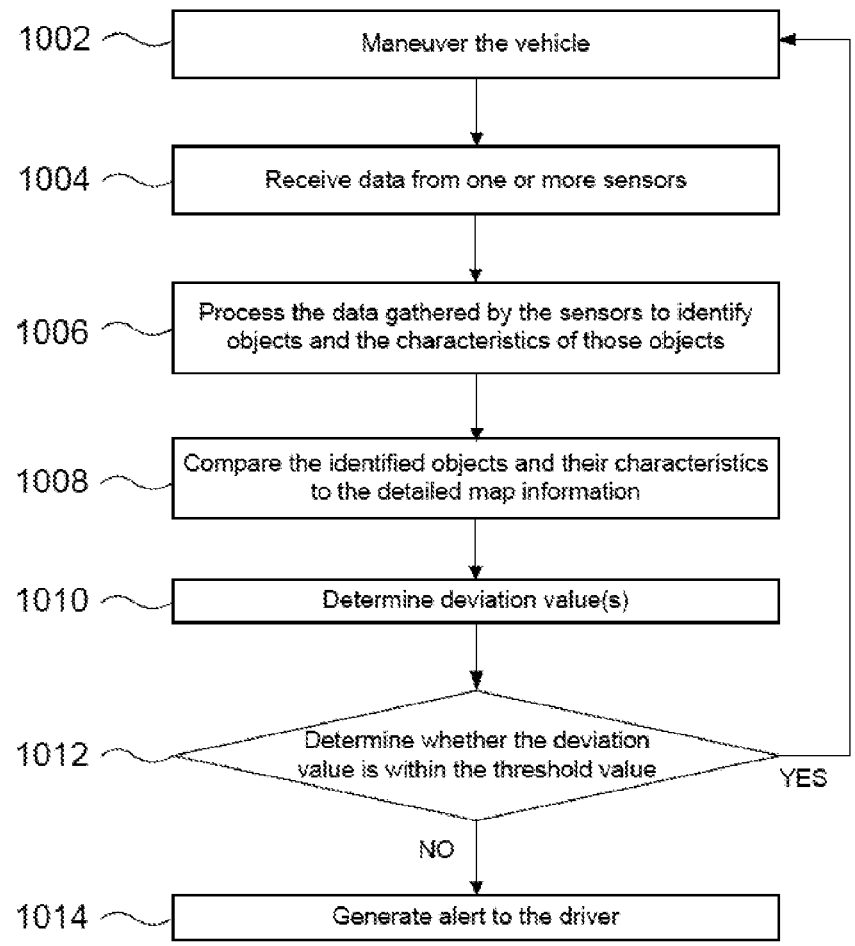
FIG. 10 is another flow diagram in accordance with aspects of the disclosure.

FIG. 10 illustrates an example flow chart 1000 in accordance with some of the aspects described above. In block 1002, the computer 110 maneuvers the vehicle as described above. The computer 110 receives data from one or more sensors at block 1004. For example, as described above, the computer 110 may receive information from a laser, camera, radar unit, etc. The computer processes the sensor data to detect one or more objects and one or more characteristics of those one or more objects at block 1006. For each detected object, the computer 110 compares the one or more characteristics of the detected object to detailed map information at block 1008. For example, a characteristic for the location or size of a stationary object may be compared to the locations of objects in the detailed map information 136. The computer 110 then determines a deviation value for the compared one or more characteristics at block 1010. The computer determines whether the deviation values are within threshold values for the relevant characteristics at block 1012. If so, the computer 110 continues to maneuver the vehicle at block 1002, for example, based on the received sensor data. Returning to block 1014, if the deviation values are not within the relevant threshold deviation values at block 1012, the computer 110 generates an alert to the driver at block 1014. For example, as described above, the computer 110 may cause a message to be displayed or played to the driver to inform him or her of the need to take control of the vehicle.

Figure 11:
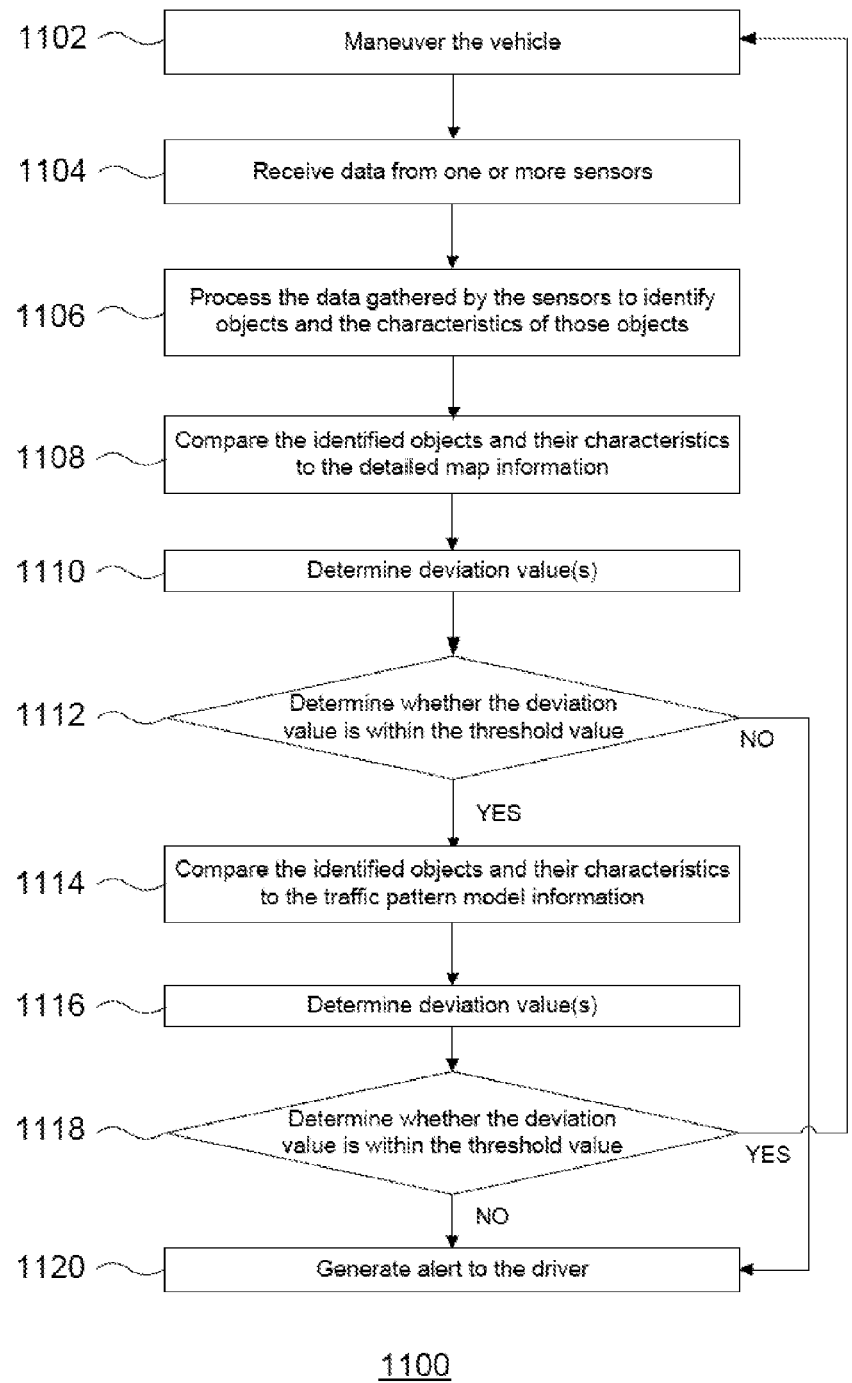
FIG. 11 is a further flow diagram in accordance with aspects of the disclosure.

The traffic pattern model information and detailed map information described above may also be used in combination to safely maneuver the vehicle 101. For example, FIG. 11 is a flow diagram 1100 illustrating one of many possible combinations of the aspects described above. In block 1102, the computer 110 maneuvers the vehicle as described above. The computer 110 receives data from one or more sensors at block 1104. For example, as described above, the computer 110 may receive information from a laser, camera, radar unit, etc. The computer processes the sensor data to detect one or more objects and one or more characteristics of those one or more objects at block 1106. For each detected object, the computer 110 compares the one or more characteristics of the detected object to detailed map information at block 1108. For example, the location, size, and/or shape of an object may be compared to the locations of objects in the detailed map information 136. The computer 110 then determines a deviation value for the compared one or more characteristics at block 1110. The computer then determines whether the deviation values are within threshold values for the relevant characteristics at block 1112. If the deviation values are not within the relevant threshold deviation values at block 1112, the computer 110 generates an alert to the driver at block 1120. For example, as described above, the computer 110 may cause a message to be displayed or played to the driver to inform him or her of the need to take control of the vehicle.

Returning to block 1112, if the deviation values are not within the relevant threshold deviation values, then for each detected object, the computer 110 compares the one or more characteristics of the detected object to traffic pattern model information at block 1114. For example, a characteristic for speed of an object may be compared to a typical speed of objects from the model. The computer 110 then determines a deviation value for the compared characteristics at block 1116. The computer then determines whether the deviation values are within threshold values for the relevant characteristics at block 1118. If so, the computer 110 continues to maneuver the vehicle at block 1102, for example, based on the received sensor data. Returning to block 1118, if the deviation values are within the relevant threshold deviation values, the computer 110 generates an alert to the driver at block 1120. For example, as described above, the computer 110 may cause a message to be displayed or played to the driver to inform him or her of the need to take control of the vehicle.

In addition to traffic pattern model information and the detailed map information, the computer 110 may rely on other information to determine whether to alert a driver to take control of the vehicle. For example the computer 110 may use various sensors such as atmospheric sensors or moisture sensors to detect current weather conditions. This sensor data may be supplemented by information received at the vehicle, for example, weather reports. If the weather conditions indicate an unsafe situation for the vehicle, for example, icy conditions or heavy snow, the computer 110 may generate and provide an alert to the driver as described above.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   receiving data from one or more sensors associated with a vehicle;
   detecting an object and a characteristic for the detected object based on the received data;
   determining, by a processor, a deviation value for the detected object based on a comparison of the characteristic for the detected object to traffic pattern model information, the traffic pattern model information including an expected range of values for a characteristic of objects in the road;
   comparing the deviation value to a threshold deviation value for an expected range of values for the characteristic; and
   when the deviation value is outside of the threshold deviation value, providing a notification to a driver of the vehicle.

2. The method of claim 1, further comprising receiving input from the driver indicating that the driver has taken control of the vehicle.

3. The method of claim 1, wherein the characteristic includes a position of the detected object and the deviation value is determined by calculating a difference between the position of the detected object and an expected range of values for position defined in the traffic pattern model information.

4. The method of claim 1, wherein the characteristic includes a speed of the detected object and the deviation value is determined by calculating a difference between the speed of the detected object and an expected range of values for speed defined in the traffic pattern model information.

5. The method of claim 1, wherein the characteristic includes a trajectory of the detected object and the deviation value is determined by calculating a difference between the trajectory of the detected object and an expected range of values for trajectory defined in the traffic pattern model information.

6. The method of claim 1, further comprising:
   detecting a second object and a second characteristic for the second detected object based on the received data;
   determining a second deviation value for the second detected object based on a comparison of the second characteristic for the second detected object to the traffic pattern model information;
   comparing the second deviation value to the threshold deviation value for an expected range of values for the second characteristic; and
   when the deviation value is within the threshold deviation value and the second deviation value is outside of a second threshold deviation value, providing the notification to the driver the vehicle.

7. The method of claim 1, further comprising:
   detecting a second object and a second characteristic for the detected object based on the received data;
   determining a second deviation value for the second detected object based on a comparison of the second characteristic for the second detected object to the traffic pattern model information; and
   before providing the notification, determining whether the second deviation value is within a second threshold deviation value based on a comparison of the second deviation value to the second threshold deviation value.

8. The method of claim 1, further comprising:
   determining a second deviation value for the detected object based on a comparison of the characteristic for the detected object to detailed map information describing expected features of the road and characteristics of the expected features;
   comparing the second deviation value to a second threshold deviation value for the expected characteristics of the expected features; and
   when the second deviation value is outside of the second threshold deviation value, providing the notification to the driver of the vehicle.

9. A method comprising:
   receiving data from one or more sensors associated with a vehicle;
   detecting an object and a characteristic for the detected object based on the received data;
   determining, by a processor, a deviation value for the detected object based on a comparison of the characteristic to detailed map information describing expected features of the road and characteristics of the expected features;
   comparing the deviation value to a threshold deviation value for the expected characteristics of the expected features; and
   when the deviation value is outside of the threshold deviation value, providing a notification to the driver of the vehicle.

10. The method of claim 9, further comprising receiving input from the driver indicating that the driver has taken control of the vehicle.

11. The method of claim 9, wherein the characteristic includes a position of the detected object and the deviation value is determined by calculating a difference between the position of the detected object and an expected characteristic for position defined in the detailed map information.

12. The method of claim 9, wherein the characteristic includes a shape of the detected object and the deviation value is determined by calculating a difference between the shape of the detected object and an expected characteristic for shape defined in the detailed map information.

13. The method of claim 9, wherein the characteristic includes a size of the detected object and the deviation value is determined by calculating a difference between the size of the detected object and an expected characteristic for size defined in the detailed map information.

14. The method of claim 9, further comprising:
   detecting a second object and a second characteristic for the second detected object based on the received data;
   determining a second deviation value for the second detected object based on a comparison of the second characteristic and the detailed map information;
   comparing the second deviation value to a second threshold deviation value for the expected characteristics of the expected features; and
   when the deviation value is within the threshold deviation value and the second deviation value is outside of the second threshold deviation value, providing a notification to the driver of the vehicle.

15. The method of claim 9, further comprising:
   detecting a second object and a second characteristic for the second detected object based on the received data;
   determining a second deviation value for the second detected object based on a comparison of the second characteristic and the detailed map information; and
   before providing the notification, determining whether the second deviation value is within a second threshold deviation value.

16. A method comprising:
   receiving data from one or more sensors associated with a vehicle;
   detecting an object and a characteristic for the detected object based on the received data;
   determining, by a processor, a deviation value for the detected object based on a comparison of the characteristic and traffic pattern model information, the traffic pattern model information including an expected range of values for a characteristic of objects in the road;
   comparing the deviation value to a threshold deviation value for the expected range of values for the characteristic of the given object; and
   when the deviation value is outside of the threshold deviation value, maneuvering, without input from a driver, the vehicle defensively.

17. The method of claim 16, wherein maneuvering the vehicle defensively includes slowing the vehicle down.

18. The method of claim 16, wherein maneuvering the vehicle defensively includes changing lanes.

19. The method of claim 16, wherein maneuvering the vehicle defensively includes increasing the distance between the vehicle and another object.

20. The method of claim 16, wherein the characteristic includes a position of the detected object and the deviation value is determined by calculating a difference between the position of the detected object and an expected range of values for position defined in the traffic pattern model information.

21. The method of claim 16, wherein the characteristic includes a speed of the detected object and the deviation value is determined by calculating a difference between the speed of the detected object and an expected range of values for speed defined in the traffic pattern model information.

22. The method of claim 16, wherein the characteristic includes a trajectory of the detected object and the deviation value is determined by calculating a difference between the trajectory of the detected object and an expected range of values for trajectory defined in the traffic pattern model information.

23. The method of claim 16, further comprising:
    detecting a second object and a second characteristic for the detected object based on the received data;
    determining a second deviation value for the second detected object based on a comparison of the second characteristic to the traffic pattern model information;
    comparing the second deviation value to a second threshold deviation value for the expected range of values for the characteristic of the given object; and
    when the deviation value is within the threshold deviation value and the second deviation value is outside of the second threshold deviation value, maneuvering the vehicle defensively.

24. The method of claim 16, further comprising:
    detecting a second object and a second characteristic for the detected object based on the received data;
    determining a second deviation value for the second detected object based on a comparison of the second characteristic and the traffic pattern model information; and
    before maneuvering the vehicle defensively, determining whether the second deviation value is within a second threshold deviation value based on a comparison of the second deviation value to the second threshold deviation value.

25. The method of claim 16, further comprising:
    determining a second deviation value for the detected object based on a comparison of the characteristic for the detected object and detailed map information describing expected features of the road and characteristics of the expected features;
    comparing the second deviation value to a second threshold deviation value for the expected characteristics of the expected features;
    when the second deviation value is outside of the second threshold deviation value, maneuvering the vehicle defensively.

26. A method comprising:
    receiving data from one or more sensors associated with a vehicle;
    detecting an object and a characteristic for the detected object based on the received data;
    determining, by a processor, a deviation value for the detected object based on a comparison of the characteristic for the detected object and detailed map information describing expected features of the road and characteristics of the expected features;
    comparing the deviation value to a threshold deviation value for the expected characteristics of the expected features; and
    identifying a mismatched area when the deviation value is outside of the threshold deviation value.

27. The method of claim 26, wherein the characteristic includes a position of the detected object and the deviation value is determined by calculating a difference between the position of the detected object and an expected characteristic for position defined in the detailed map information.

28. The method of claim 26, wherein the characteristic includes a shape of the detected object and the deviation value is determined by calculating a difference between the shape of the detected object and an expected characteristic for shape defined in the detailed map information.

29. The method of claim 26, wherein the characteristic includes a size of the detected object and the deviation value is determined by calculating a difference between the size of the detected object and an expected characteristic for size defined in the detailed map information.

30. The method of claim 26, further comprising:
    detecting a second object and a second characteristic for the detected object based on the received data;
    determining a second deviation value for the second detected object based on a comparison of the second characteristic and the detailed map information;
    comparing the second deviation value to a second threshold deviation value for the expected characteristics of the expected features;
    when the deviation value is within the threshold deviation value and the second deviation value is outside of the second threshold deviation value, identifying a mismatched area; and
    maneuvering, without input from the driver, the vehicle to avoid the mismatched area.

31. The method of claim 26, further comprising:
    detecting a second object and a second characteristic for the detected object based on the received data;
    determining a second deviation value for the second detected object based on a comparison of the second characteristic and the detailed map information; and
    before identifying the mismatched area, determining whether the second deviation value is within the second threshold deviation value.

32. A device comprising:
    memory storing traffic pattern model information including an expected range of values for a characteristic of objects in the road;
    a processor coupled to the memory, the processor configured to:
    receive data from one or more sensors associated with a vehicle;
    detect an object and a characteristic for the detected object based on the received data;
    determine a deviation value for the detected object based on a comparison of the characteristic for the detected object to the traffic pattern model information;
    compare the deviation value to a threshold deviation value for the expected range of values for the characteristic of the given object; and
    when the deviation value is outside of the threshold deviation value, provide a notification to a driver.

33. The device of claim 32, wherein the processor is further configured to slow the vehicle down if the driver does not take control after the notification is provided.

34. The device of claim 32, wherein the processor is further configured to maneuver the vehicle into a different lane if the driver does not take control after the notification is provided.

35. A device comprising:
    memory storing detailed map information describing expected features of the road and characteristics of the expected features;
    a processor coupled to the memory, the processor configured to:
    receive data from one or more sensors associated with a vehicle;
    detect an object and a characteristic for the detected object based on the received data;
    determine a deviation value for the detected object based on a comparison of the characteristic and the detailed map information;
    compare the deviation value to a threshold deviation value for the expected characteristics of the expected features; and
    identify a mismatched area when the deviation value is outside of the threshold deviation value.

36. The device of claim 35, wherein the characteristic includes a position of the detected object and the deviation value is determined by calculating a difference between the position of the detected object and an expected characteristic for position defined in the detailed map information.

37. The device of claim 35, wherein the characteristic includes a shape of the detected object and the deviation value is determined by calculating a difference between the shape of the detected object and an expected characteristic for shape defined in the detailed map information.

38. A non-transitory tangible computer-readable storage medium on which computer readable instructions of a program are stored, the instructions, when executed by a processor, cause the processor to perform a method, the method comprising:

receiving data from one or more sensors associated with a vehicle;

detecting an object and a characteristic for the detected object based on the received data;

determining a deviation value for the detected object based on a comparison of the characteristic and traffic pattern model information, the traffic pattern model information including an expected range of values for a characteristic of objects in the road;

comparing the deviation value to a threshold deviation value for the expected range of values for the characteristic of the given object; and when the deviation value is outside of the threshold deviation value, maneuvering, without input from a driver, the vehicle defensively.

39. A non-transitory tangible computer-readable storage medium on which computer readable instructions of a program are stored, the instructions, when executed by a processor, cause the processor to perform a method, the method comprising:

receiving data from one or more sensors associated with a vehicle;

detecting an object and a characteristic for the detected object based on the received data;

determining, by a processor, a deviation value for the detected object based on a comparison of the characteristic for the detected object and detailed map information describing expected features of the road and characteristics of the expected features;

comparing the deviation value to a threshold deviation value for the expected characteristics of the expected features; and identifying a mismatched area when the deviation value is outside of the threshold deviation value.

* * * * *

UNITED STATES PATENT AND TRADEMARK OFFICE
CERTIFICATE OF CORRECTION

PATENT NO.       : 8,718,861 B1
APPLICATION NO.  : 13/444215
DATED            : May 6, 2014
INVENTOR(S)      : Montemerlo et al.

It is certified that error appears in the above-identified patent and that said Letters Patent is hereby corrected as shown below:

In the claims

Column 21, line 15, Claim 6 after "driver" insert -- of --.
Column 24, line 12, Claim 30 delete "a" and insert therefor -- the --.

Signed and Sealed this
Twenty-sixth Day of January, 2016

Michelle K. Lee
*Director of the United States Patent and Trademark Office*